United States Patent
Balakrishnan et al.

(10) Patent No.: US 6,304,462 B1
(45) Date of Patent: *Oct. 16, 2001

(54) METHOD AND APPARATUS PROVIDING A MULTI-FUNCTION TERMINAL FOR A POWER SUPPLY CONTROLLER

(75) Inventors: Balu Balakrishnan; Alex B. Djenguerian, both of Saratoga; Leif O. Lund, San Jose, all of CA (US)

(73) Assignee: Power Integrations, Inc., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/698,926

(22) Filed: Oct. 26, 2000

Related U.S. Application Data

(62) Division of application No. 09/405,209, filed on Sep. 24, 1999.

(51) Int. Cl.[7] .................................................. H02M 3/335
(52) U.S. Cl. ...................................... 363/21.01; 363/56.01
(58) Field of Search .................................... 363/15, 16, 20, 363/21.01, 21.02, 21.04, 21.09, 21.1, 21.12, 21.17, 21.18, 56.01, 56.11, 97

(56) References Cited

U.S. PATENT DOCUMENTS

| | | | |
|---|---|---|---|
| 4,584,623 | 4/1986 | Bello et al. | 361/90 |
| 5,266,884 | 11/1993 | Agiman | 323/284 |
| 5,729,448 * | 3/1998 | Haynie et al. | 363/97 |
| 5,764,495 | 6/1998 | Faulk | 363/21 |
| 5,784,231 | 7/1998 | Majid et al. . | |
| 5,841,313 | 11/1998 | Levin et al. | 327/393 |
| 5,959,851 | 9/1999 | Shutts | 363/21 |
| 5,982,639 * | 11/1999 | Balakirshnan | 363/21 |

* cited by examiner

*Primary Examiner*—Jessica Han
(74) *Attorney, Agent, or Firm*—Blakely, Sokoloff, Taylor & Zafman, LLP

(57) ABSTRACT

A power supply controller having a multi-function terminal. In one embodiment, a power supply controller for switched mode power supply includes a drain terminal, a source terminal, a control terminal and a multi-function terminal. The multi-function terminal may be configured in a plurality of ways providing any one or some of a plurality of functions including on/off control, external current limit adjustments, under-voltage detection, over-voltage detection and maximum duty cycle adjustment. The operation of the multi-function terminal varies depending on whether a positive or negative current flows through the multi-function terminal. A short-circuit to ground from the multi-function terminal enables the power supply controller. A short-circuit to a supply voltage from the multi-function terminal disables the power supply controller. The current limit of an internal power switch of the power supply controller may be adjusted by externally setting a negative current from the multi-function terminal. The multi-function terminal may also be coupled to the input DC line voltage of the power supply through a resistance to detect an under-voltage condition, an over-voltage condition and/or adjust the maximum duty cycle of power supply controller. Synchronization of the oscillator of the power supply controller may also be realized by switching the multi-function terminal to power or ground at the desired times.

34 Claims, 13 Drawing Sheets

METHOD AND APPARATUS PROVIDING A MULTI-FUNCTION TERMINAL FOR A POWER SUPPLY CONTROLLER

This is a Divisional of U.S. application Ser. No. 09/405,209, filed Sep. 24, 1999, now pending.

BACKGROUND OF THE INVENTION

1. Field of the Invention

The present invention relates generally to power supplies and, more specifically, the present invention relates to a switched mode power supply controller.

2. Background Information

Electronic devices use power to operate. Switched mode power supplies are commonly used due to their high efficiency and good output regulation to power many of today's electronic devices. In a known switched mode power supply, a low frequency (e.g. 50 Hz or 60 Hz mains frequency), high voltage alternating current (AC) is converted to high voltage direct current (DC) with a diode rectifier and capacitor. The high voltage DC is then converted to high frequency (e.g. 30 to 300 kHz) AC, using a switched mode power supply control circuit. This high frequency, high voltage AC is applied to a transformer to transform the voltage, usually to a lower voltage, and to provide safety isolation. The output of the transformer is rectified to provide a regulated DC output, which may be used to power an electronic device. The switched mode power supply control circuit provides usually output regulation by sensing the output controlling it in a closed loop.

A switched mode power supply may include an integrated circuit power supply controller coupled in series with a primary winding of the transformer. Energy is transferred to a secondary winding from the primary winding in a manner controlled by the power supply controller to provide the clean and steady source of power at the DC output. The transformer of a switched mode power supply may also include another winding called a bias or feedback winding. The bias winding provides the operating power for the power supply controller and in some cases it also provides a feedback or control signal to the power supply controller. In some switched mode power supplies, the feedback or control signal can come through an opto-coupler from a sense circuit coupled to the DC output. The feedback or control signal may be used to modulate a duty cycle of a switching waveform generated by the power supply controller or may be used to disable some of the cycles of the switching waveform generated by the power supply controller to control the DC output voltage.

A power supply designer may desire to configure the power supply controller of a switched mode power supply in a variety of different ways, depending on for example the particular application and/or operating conditions. For instance, there may be one application in which the power supply designer would like the power supply controller to have one particular functionality and there may be another application in which the power supply designer would like the power supply controller to have another particular functionality. It would be convenient for power supply designer to be able to use the same integrated power supply controller for these different functions.

In order to provide the specific functions to the power supply controller, additional pins or electrical terminals are added for each function to the integrated circuit power supply controllers. Consequently, each additional function generally translates into an additional pin on the power supply controller chip, which translates into increased costs and additional external components. Another consequence of providing additional functionality to power supply controllers is that there is sometimes a substantial increase in power consumption by providing the additional functionality.

SUMMARY OF THE INVENTION

Power supply controller methods and apparatuses are disclosed. In one embodiment, a power supply controller circuit is described including a current input circuit coupled to receive a current. In one embodiment, the current input circuit is to generate an enable/disable signal in response to the current. The power supply controller is to activate and deactivate the power supply in response to the enable/disable signal. In another embodiment, a current limit of a power switch of the power supply controller is adjusted in response to the current. In yet another embodiment, a maximum duty cycle of the power switch of the power supply is adjusted in response to the current. Additional features and benefits of the present invention will become apparent from the detailed description, figures and claims set forth below.

BRIEF DESCRIPTION OF THE DRAWINGS

The present invention detailed illustrated by way of example and not limitation in the accompanying figures.

DETAILED DESCRIPTION

Figure 1:
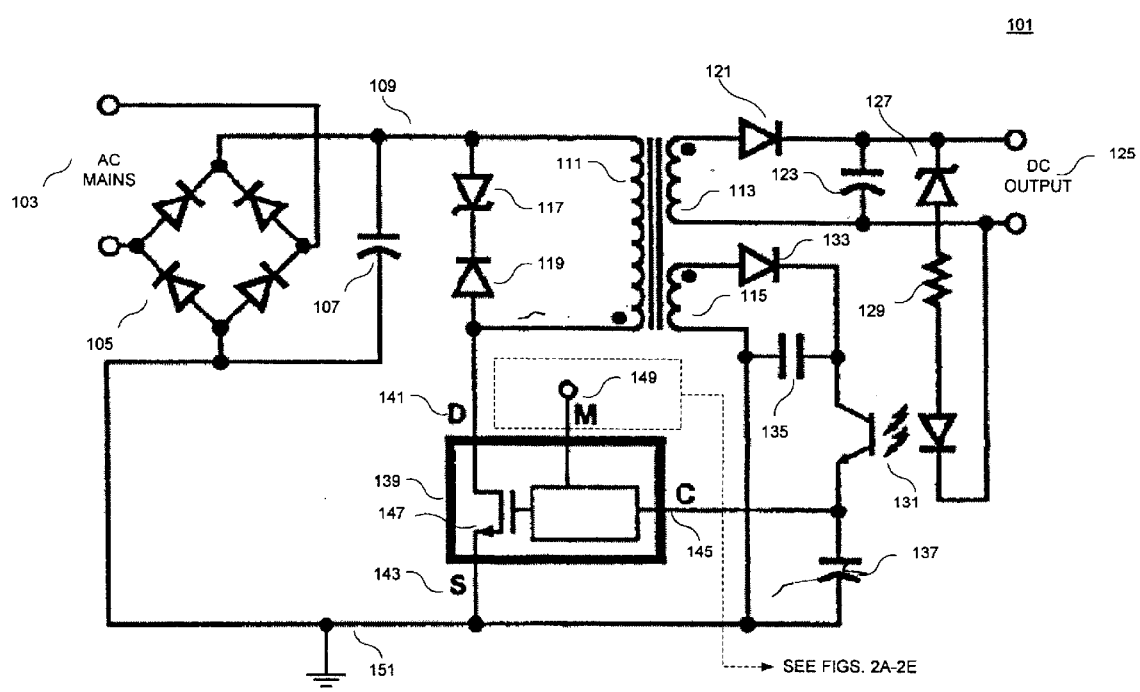
FIG. 1 is a schematic illustrating one embodiment of a power supply including a power supply controller having a multi-function terminal in accordance with the teachings of the present invention.

A method and an apparatus providing a multi-function terminal in a power supply controller is disclosed. In the following description, numerous specifically details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

In one embodiment of the present invention, a power supply controller is provided with the functionality of being able to remotely turn on and off the power supply. In another embodiment, the power supply controller is provided with the functionality of being able to externally set the current limit of a power switch in the power supply controller, which makes it easier to prevent saturation of the transformer reducing transformer size and cost. Externally settable current limit also allows the maximum power output to be kept constant over a wide input range reducing the cost of components that would otherwise have to handle the excessive power at high input voltages. In yet another embodiment, the power supply controller is provided with the functionality of being able to detect an under-voltage condition in the input line voltage of the power supply so that the power supply can be shutdown gracefully without any glitches on the output. In still another embodiment, the power supply controller is provided with the functionality of being able to detect an over-voltage condition in the input line voltage of the power supply so that the power supply can be shut down under this abnormal condition. This allows the power supply to handle much higher surge voltages due to the absence of reflected voltage and switching transients on the power switch in the power supply controller. In another embodiment, the power supply controller is provided with the functionality of being able to limit the maximum duty cycle of a switching waveform generated by a power supply controller to control the DC output of the power supply. In so doing, saturation of the transformer during power up is reduced and the excess power capability at high input voltages is safely limited. Increased duty cycle at low DC input voltages also allows for smaller input filter capacitance. Thus, this feature results in cost savings on many components in the power supply including the transformer. In yet another embodiment, some or all of the above functions are provided with a single multi-function terminal in the power supply controller. That is, in one embodiment, a plurality of additional functions are provided to power supply controller without the consequence of adding a corresponding plurality of additional terminals or pins to the integrated circuit package of the power supply controller. In one embodiment, one or some of the above functions are available when positive current flows into the multi-function terminal. In another embodiment, one or some of the above functions are available when negative current flows out from the multi-function terminal. In one embodiment, the voltage at the multi-function terminal is fixed at a particular value depending on whether positive current flows into the multi-function terminal or whether negative current flows out from the multi-function terminal.

The multi-function features listed above not only save cost of many components and improve power supply performance but also, they save many components that would otherwise be required if these features were implemented externally.

FIG. 1 is a block diagram illustrating one embodiment of a power supply 101 including a power supply controller 139 having a multi-function terminal 149 in accordance with the teachings of the present invention. As illustrated, power supply 101 includes an AC mains input 103, which is configured to receive an AC voltage input. A diode rectifier 105 is coupled to AC mains input to rectify the AC voltage. Capacitor 107 is coupled to diode rectifier 105 to convert the rectified AC into a steady DC line voltage 109, which is coupled to a primary winding 111 of a transformer. Zener diode 117 and diode 119 are coupled across primary winding 111 to provide clamp circuitry.

As illustrated in FIG. 1, primary winding 111 is coupled to a drain terminal 141 of power supply controller 139. Power supply controller 139 includes a power switch 147 coupled between the drain terminal 141 and a source terminal 143, which is coupled to ground. When power switch 147 is turned on, current flows through primary winding 111 of the transformer. When current flows through primary winding 111, energy is stored in the transformer. When power switch 147 is turned off, current does not flow through primary winding 111 and the energy stored in the transformer is transferred to secondary winding 113 and bias winding 115.

A DC output voltage is produced at DC output 125 through diode 121 and capacitor 123. Zener diode 127, resistor 129 and opto-coupler 131 form feedback circuitry or regulator circuitry to produce a feedback signal received at a control terminal 145 of the power supply controller 139. The feedback or control signal is used to regulate or control the voltage at DC output 125. As the voltage across DC output 125 rises above a threshold voltage determined by Zener diode 127, resistor 129 and opto-coupler 131, additional feedback current flows into control terminal 145. In one embodiment, control terminal 145 also provides a supply voltage for circuitry of power supply controller 139 through bias winding 115, diode 133, capacitor 135 and capacitor 137.

As shown in FIG. 1, power supply controller 139 includes a multi-function terminal 149, which in one embodiment enables power supply controller 139 to provide one or a plurality of different functions, depending on how multi-function terminal 149 is configured. Some examples of how multi-function terminal 149 may be configured are shown in FIGS. 2A through 2F.

Figure 2A:
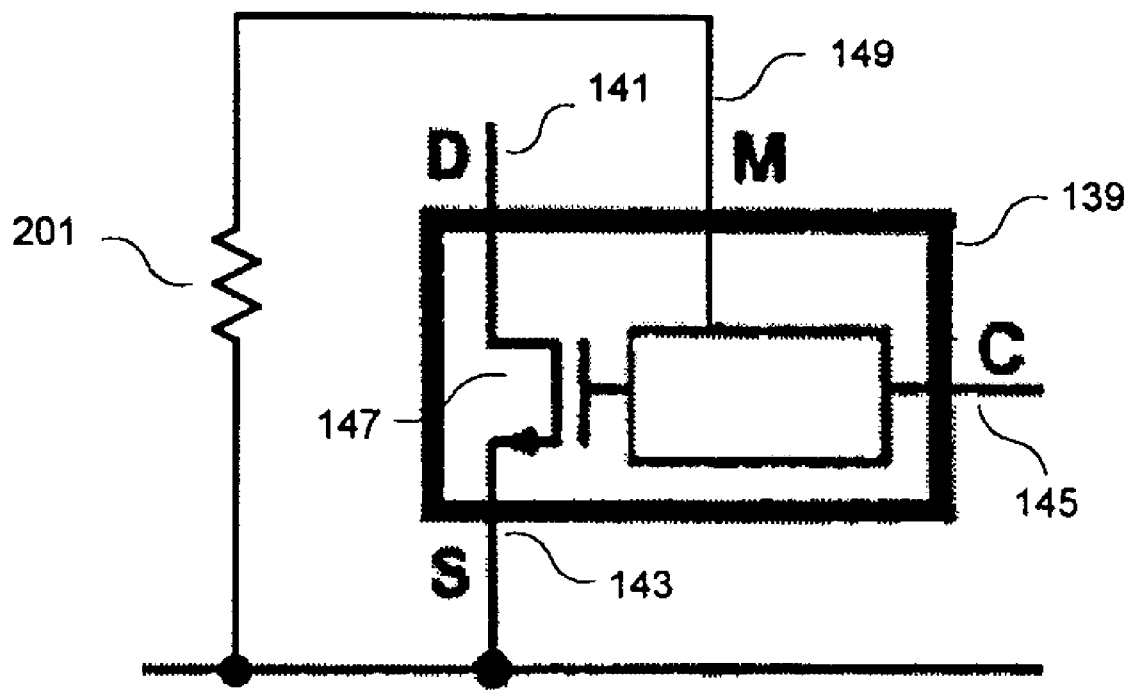
FIG. 2A is a schematic illustrating one embodiment of a power supply controller having a multi-function terminal configured to limit the current of the power switch in the power supply controller to a desired value in accordance with the teachings of the present invention.

For instance, FIG. 2A is a diagram illustrating one embodiment of a power supply controller 139 including a resistor 201 coupled between the multi-function terminal 149 and the source terminal 143. In one embodiment, the source terminal 143 is coupled to ground. In one embodiment, the voltage at multi-function terminal 149 is fixed when negative current flows from multi-function terminal 149. In one embodiment, the negative current that flows through resistor 201 is used to set externally the current limit of power switch 147. Thus, the power supply designer can choose a particular resistance for resistor 201 to set externally the current limit of power switch 147. In one embodiment, resistor 201 may be a variable resistor, a binary weighted chain of resistors or the like. In such embodiment, the current limit of power switch 147 may be adjusted externally by varying the resistance of resistor 201. In one embodiment, the current limit of power switch 147 is directly proportional to the negative current flowing through resistor 201.

Figure 2B:
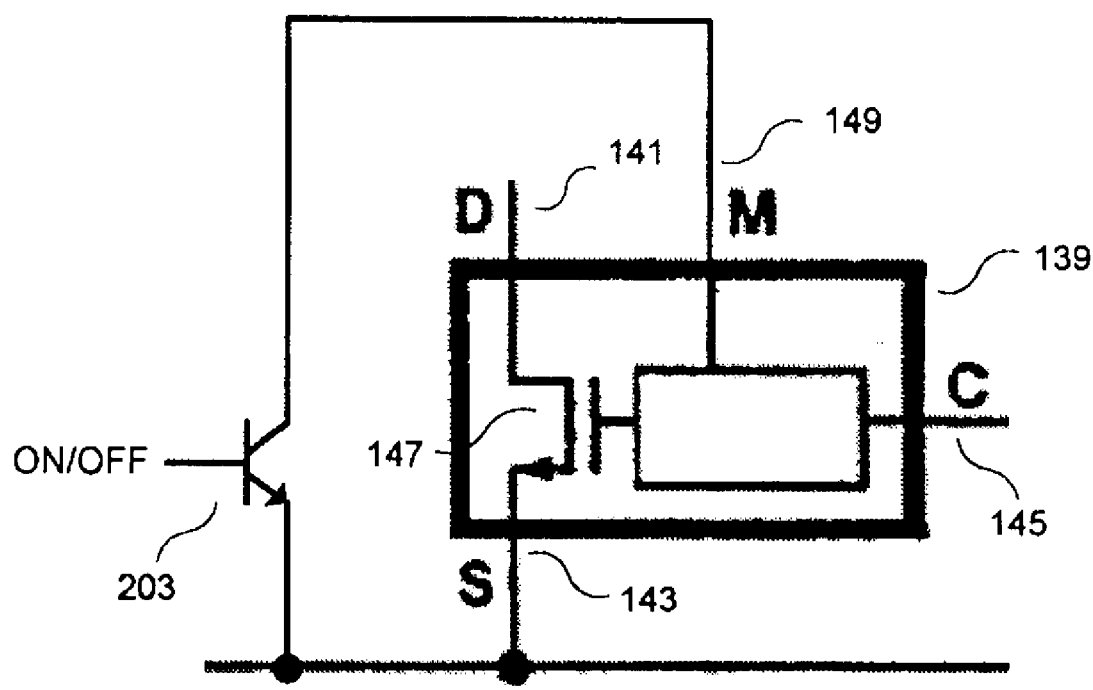
FIG. 2B is a schematic illustrating one embodiment of a power supply having a multi-function terminal configured to provide a switchable on/off control to the power supply in accordance with the teachings of the present invention.

FIG. 2B is a diagram illustrating another embodiment of a power supply controller 139 including a switch 203 coupled between multi-function terminal 149 and source terminal 143. In one embodiment, source terminal 143 is coupled to ground. In one embodiment, power supply controller 139 switches power switch 147 when multi-function terminal 149 is coupled to ground through switch 203. In one embodiment, power supply controller 139 does not switch power switch 147 when multi-function terminal 149 is disconnected from ground through switch 203. In particular, when an adequate amount of negative current flows from multi-function terminal 149, power supply 101 is enabled. When substantially no current flows from multi-function terminal 149, power supply 101 is disabled. In one embodiment, the amount of current that flows from multi-function terminal 149 to ground through switch 203 is limited. Thus, in one embodiment, even if multi-function terminal 149 is short-circuited to ground through switch 203, the amount of current flowing from multi-function terminal 149 to ground is limited to a safe amount.

Figure 2C:
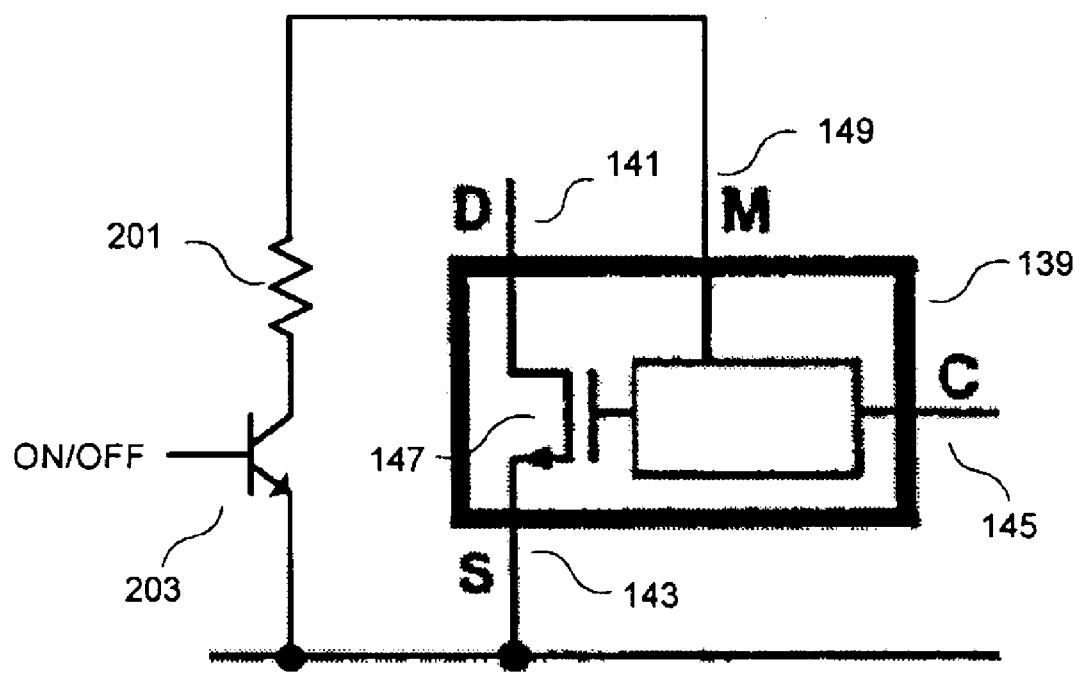
FIG. 2C is a schematic illustrating one embodiment of the power supply having a multi-function terminal configured to limit the current of the power switch in the power supply controller to a desired value and provide a switchable on/off control to the power supply controller in accordance with the teachings of the present invention.

FIG. 2C is a diagram illustrating yet another embodiment of a power supply controller 139 including resistor 201 and switch 203 coupled in series between multi-function terminal 149 and source terminal 143, which in one embodiment is ground. The configuration illustrated in FIG. 2C combines the functions illustrated and described in connection with FIGS. 2A and 2B above. That is, the configuration illustrated in FIG. 2C illustrates a power supply controller 139 having external adjustment of the current limit of power switch 147, through the selection of the resistance for resistor 201, and on/off functionality through switch 203. When switch 203 is on, power supply controller 139 will switch power switch 147 with a current limit set by resistor 201. When switch 203 is off, power supply controller 139 will not switch power switch 147 and power supply 101 will be disabled.

Figure 2D:
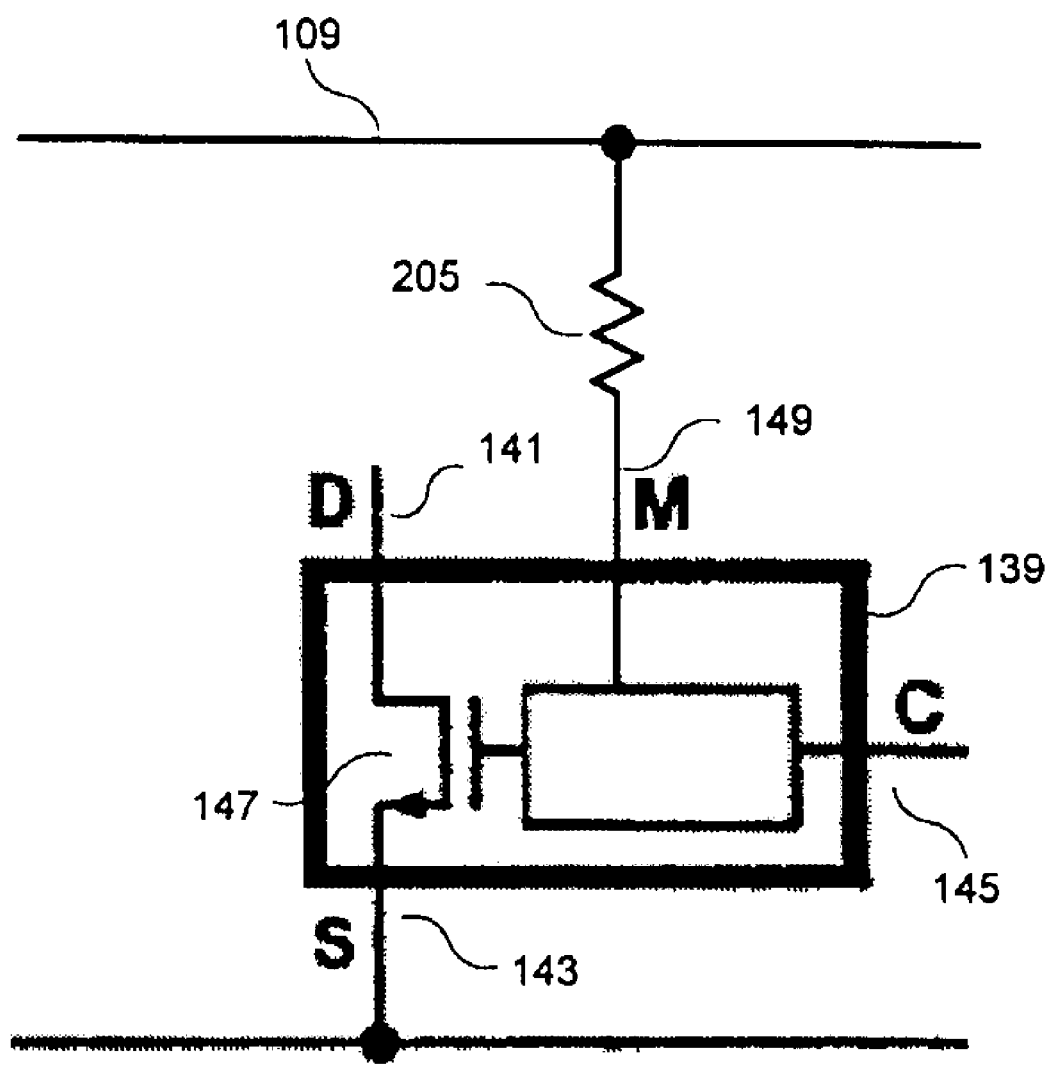
FIG. 2D is a schematic illustrating one embodiment of a power supply having a multi-function terminal configured to provide line under-voltage detection, line over-voltage detection and maximum duty cycle reduction of the power supply in accordance with the teachings of the present invention.

FIG. 2D is a diagram illustrating still another embodiment of a power supply controller 139 including a resistor 205 coupled between the line voltage 109 and multi-function terminal 149. Referring briefly back to FIG. 1 above, DC line voltage 109 is generated at capacitor 107 and is input to the primary winding 111 of the transformer of power supply 101 Referring back the FIG. 2D, in one embodiment, multi-function terminal 149 is substantially fixed at a particular voltage when positive current flows into multi-function terminal 149. Therefore, the amount of positive current flowing through resistor 205 into multi-function terminal 149 is representative of line voltage 109, which is input to the primary winding 111. Since the positive current flowing through resistor 205 into multi-function terminal 149 represents the line voltage 109, power supply controller 139 can use this positive current to sense an under-voltage condition in line voltage 109 in one embodiment. An under-voltage condition exists when the line voltage 109 is below a particular under-voltage threshold value. In one embodiment, if a line under-voltage condition is detected, power switch 147 is not switched by power supply controller 139 until the under-voltage condition is removed.

In one embodiment, power supply controller 139 can use the positive current flowing through resistor 205 into multi-function terminal 149 to detect an over-voltage condition in line voltage 109. An over-voltage condition when line voltage 109 rises above a particular over-voltage threshold value. In one embodiment, if a line over-voltage condition is detected, power switch 147 is not switched by power supply controller 139 until the over-voltage condition is removed.

In one embodiment, power supply controller 139 can also use the positive current flowing through resistor 205 and multi-function terminal 149 to detect for increases or decreases in line voltage 109. As line voltage 109 increases, for a given fixed maximum duty cycle, the maximum power available to secondary winding 113 in power supply 101 of FIG. 1 usually increases. As line voltage 109 decreases, less power is available to secondary winding 113 in power supply 101. In most cases, the excess power available at the DC output 125 is undesirable under overload conditions due to high currents that need to be handled by components. In some instances, it is also desirable to increase the maximum power available to DC output 125 at low input DC voltages to save on cost of the input filter capacitor 107. Higher duty cycle at low DC input voltage allows lower input voltage operation for a given output power. This allows larger ripple voltage on capacitor 107, which translates to a lower value capacitor. Therefore, in one embodiment, power supply controller 139 adjusts the maximum duty cycle of a switching waveform used to control or regulate power switch 147 in response to increases or decreases in line voltage 109. In one embodiment, the maximum duty cycle of the switching waveform used to control power switch 147 is inversely proportional to the line voltage 109. As mentioned earlier, reducing the duty cycle with increasing input DC voltage has many advantages. For instance, it reduces the value and hence the cost of capacitor 107. In addition, it limits excess power at high line voltages reducing the cost of the clamp circuit (117, 119), the transformer and the output rectifier 121 due to reduced maximum power ratings on these components.

It is appreciated that since only a single resistor 201 to ground, or a single resistor 205 to line voltage 109, is utilized for implementing some of the functions of power supply controller 139, a power savings is realized. For instance, if a resistor divider were to be coupled between power and ground, and a voltage output of the resistor divider coupled to a terminal of power supply controller 139 were to be used, current would continuously flow through both the resistor divider and into a sensor terminal of the power supply controller. This would result in increased power consumption. However in one embodiment of the power supply controller 139, only the single resistor 201 to ground or single resistor 205 to line voltage 109 is utilized, thereby eliminating the need for a current to flow through both the resistor divider and into power supply controller 139.

Figure 2E:
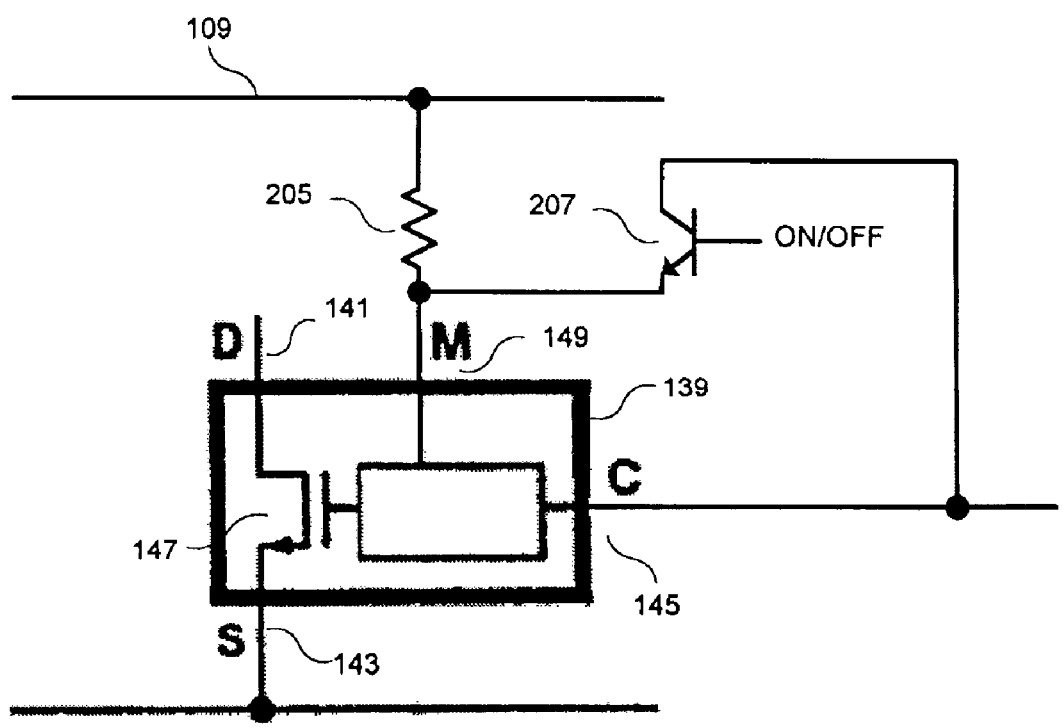
FIG. 2E is a schematic illustrating one embodiment of a power supply having a multi-function terminal configured to provide line under-voltage detection, line over-voltage detection, maximum duty cycle reduction and a switchable on/off control to the power supply in accordance with the teachings of the present invention.

FIG. 2E is a diagram illustrating yet another embodiment of a power supply controller 139 including resistor 205, as described above, coupled between the line voltage 109 and multi-function terminal 149. FIG. 2E also includes a switch 207 coupled between control terminal 145 and multi-function terminal 149. In one embodiment, resistor 205 provides the same functionality as discussed above in connection with FIG. 2D. Therefore, when switch 207 is switched off, the configuration illustrated in FIG. 2E is identical to the configuration described above in connection with FIG. 2D.

In one embodiment, control terminal 145 provides a supply voltage for power supply controller 139 in addition to providing a feedback or control signal to power supply controller 139 from DC output 125. As a result, in one embodiment, switch 207 provides in effect a switchable low resistance connection between a supply voltage (control terminal 145) and multi-function terminal 149. In one embodiment, the maximum positive current that can flow into multi-function terminal 149 is limited. Therefore, in one embodiment, even when switch 207 provides, in effect, a short-circuit connection from a supply voltage, the positive current that flows into multi-function terminal 149 is limited to a safe amount. However, in one embodiment, the positive current that does flow through switch 207, when activated, into multi-function terminal 149 triggers an over-voltage condition. As discussed above, power supply 139 discontinues switching power switch 147 during an over-voltage condition until the condition is removed. Therefore, switch 207 provides on/off functionality for power supply controller 139. When switch 207 is the activated, the low resistance path to control terminal 145 is removed and the positive current flowing into multi-function terminal 149 is limited to the current that flows from line voltage 109 through resistor 205. Assuming that neither an under-voltage condition nor an over-voltage condition exists, power supply controller 139 will resume switching power switch 147, thereby re-enabling power supply 101.

Figure 2F:
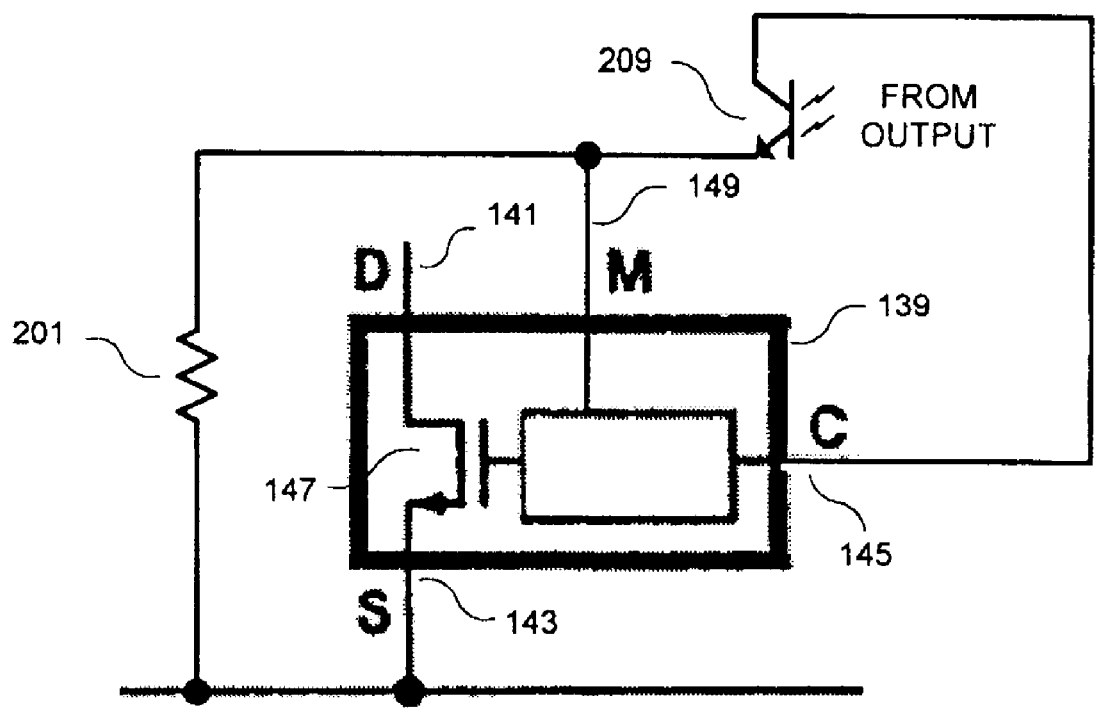
FIG. 2F is a schematic illustrating one embodiment of current mode control of a power supply controller having a multi-function terminal configured to regulate the current limit of the power switch in response to the power supply output in accordance with the teachings of the present invention.

FIG. 2F is a diagram illustrating another embodiment of a power supply controller 139 using current mode control to regulate the current limit of the power supply. As shown, resistor 201 is coupled between the multi-function terminal 149 and the source terminal 143 and the transistor 209 of an opto-coupler coupled between multi-function terminal 149 and a bias supply, such as for example control terminal 145. Similar to FIG. 2A, the negative current that flows out from multi-function terminal 149 is used to set externally the current limit of power switch 147. In the embodiment illustrated in FIG. in FIG. 2F, the current limit adjustment function can be used for controlling the power supply output by feeding a feedback signal from the output of the power supply into multi-function terminal 149. In the embodiment depicted in FIG. 2F, the current limit is adjusted in a closed loop to regulate the output of the power supply (known as current mode control) by adding the opto-coupler output between multi-function terminal 149 and the bias supply.

In one embodiment, the power supply controller configurations described in connection with FIGS. 2A through 2F all utilize the same multi-function terminal 149. Stated differently, in one embodiment, the same power supply controller 139 may be utilized in all of the configurations described. Thus, the presently described power controller 139 provides a power supply designer with added flexibility. As a result, a power supply designer may implement more than one of the above functions at the same time using the presently described power supply controller 139. In addition, the same functionality may be implemented in more than one way. For example, power supply 101 can be remotely turned on and off using either power or ground. In particular, the power supply 101 can be turned on and off by switching to and from the control terminal (supply terminal for the power supply controller) using the over-voltage detection feature, or by switching to and from ground using the on/off circuitry.

FIGS. 2A though 2F provide just a few examples of use of the multi-function terminal. A person skilled in the art will find many other configurations for use of the multi-function pin. The uses for the multi-function terminal, are therefore, not limited to the few examples shown.

It is worthwhile to note that different functions of the presently described power supply controller 139 may be utilized at different times during different modes of operation of power supply controller 139. For instance, some features may be implemented during startup operation, other functions may be implemented during normal operation, other functions may be implemented during fault conditions, while still other functions may be implemented during standby operation. Indeed, it is appreciated that a power supply designer may implement other circuit configurations to use with a power supply controller 139 in accordance with teachings of the present invention. The configurations illustrated in FIGS. 2A through 2F are provided simply for explanation purposes.

Figure 3:
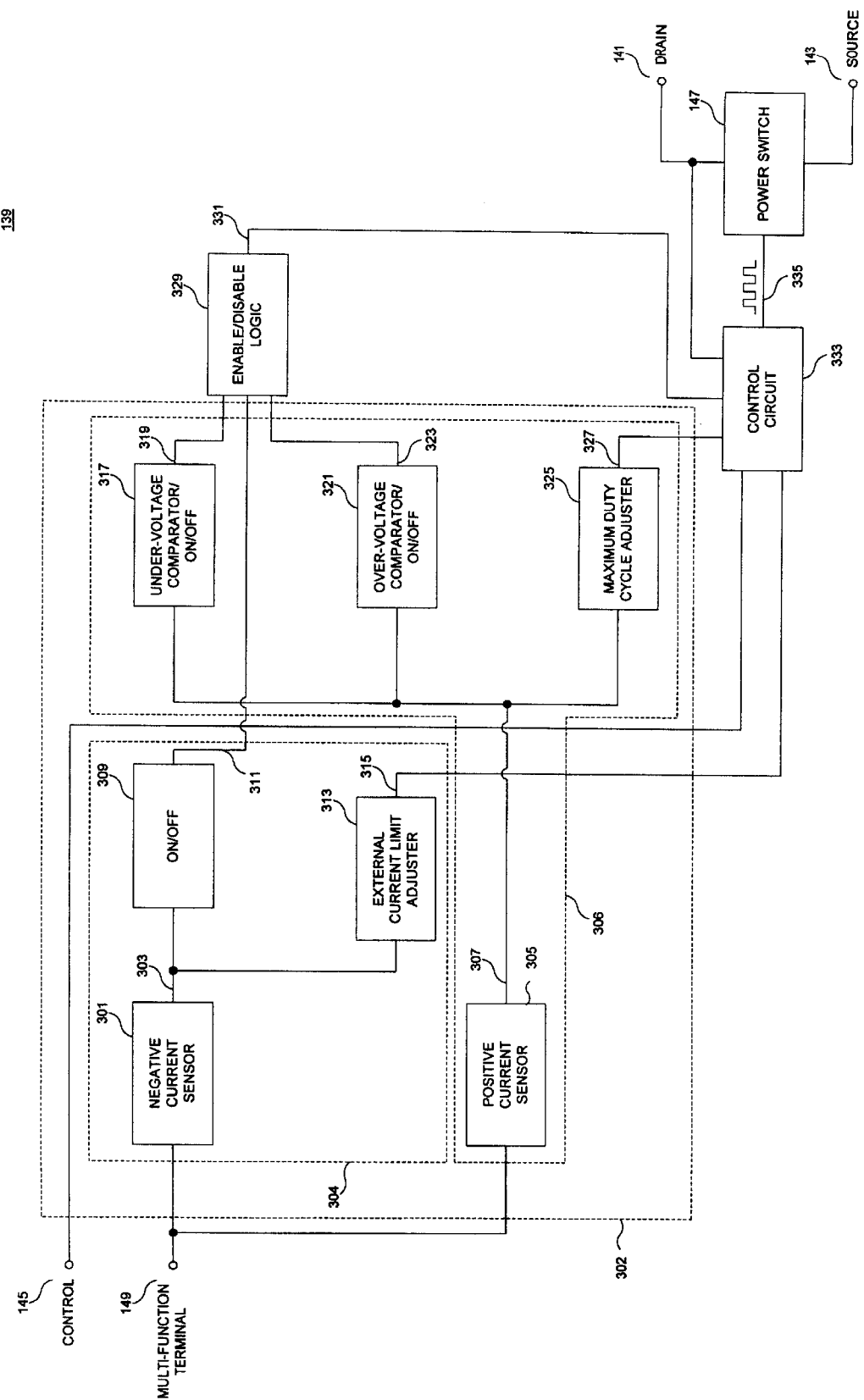
FIG. 3 is a block diagram illustrating one embodiment of a power supply controller including a multi-function terminal in accordance with teachings of the present invention.

FIG. 3 is a block diagram illustrating one embodiment of a power supply controller 139 in accordance with teachings of the present invention. As shown in the embodiment illustrated, power supply controller 139 includes a current input circuit 302, which in one embodiment serves as multi-function circuitry. In one embodiment, current input circuit 302 includes a negative current input circuit 304 and a positive current input circuit 306. In one embodiment, negative current input circuit 304 includes negative current sensor 301, on/off circuitry 309 and external current limit adjuster 313. In one embodiment, positive current input circuit 306 includes positive current sensor 305, under-voltage comparator 317, over-voltage comparator 321 and maximum duty cycle adjuster 325.

As shown in FIG. 3, negative current sensor 301 and positive current sensor 305 are coupled to multi-function terminal 149. In one embodiment, negative current sensor 301 generates a negative current sense signal 303 and positive current sensor generates a positive current sense signal 307. For purposes of this description, a negative current may be interpreted as current that flows out of multi-function terminal 149. Positive current may be interpreted as current that flows into multi-function terminal 149. In one embodiment, on/off circuitry 309 is coupled to receive negative current sense signal 303. External current limit adjuster 313 is coupled to receive negative current sense signal 303.

In one embodiment, under-voltage comparator 317 is coupled to receive positive current sense signal 307. Over-voltage comparator 321 is coupled to receive positive current sense signal 307. As discussed earlier, both under-voltage and over-voltage comparators also function as on/off circuits. Maximum duty cycle adjuster 325 is also coupled to receive positive current sense signal 307.

In one embodiment, on/off circuitry 309 generates an on/off signal 311, under-voltage comparator 317 generates an under-voltage signal 319 an over-voltage comparator 321 generates an over-voltage signal 323. As shown in the embodiment illustrated in FIG. 3, enable/disable logic 329 is coupled to receive the on/off signal 311, the under-voltage signal 319 and the over-voltage signal 323. The under-voltage and over-voltage signals can also be used for on/off functions as noted earlier.

In one embodiment, enable/disable logic 329 generates an enable/disable signal 331, which is coupled to be received by control circuit 333. The control circuit 333 is also coupled to receive a control signal from control terminal 145. In addition, control circuit 333 is also coupled to receive a drain signal from drain terminal 141, a maximum duty cycle adjustment signal 327 from maximum duty cycle adjuster 325 and an external current limit adjustment signal 315 from external current limit adjuster 313.

In one embodiment, control circuit 333 generates a switching waveforms 335, which is coupled to be received by power switch 147. In one embodiment, power switch 147 is coupled between drain terminal 141 and source terminal 143 to control a current flowing through the primary winding 111 of power supply 101, which is coupled to drain terminal 141.

In one embodiment, negative current sensor 301 senses current that flows out of negative current sensor 301 through multi-function terminal 149. Negative current sense signal 303 is generated in response to the current that flows from negative current sensor 301 through multi-function terminal 149. In one embodiment, current that flows from negative current sensor 301 through multi-function terminal 149 typically flows through an external resistance or switch coupled between multi-function terminal 149 and ground.

In one embodiment, positive current sensor 305 senses current that flows into positive current sensor 305 through multi-function terminal 149. Positive current sense signal 307 is generated in response to the current that flows into positive current sensor 305 through multi-function terminal 149. In one embodiment, current that flows into positive current sensor 305 through multi-function terminal 149 typically flows through an external resistance coupled between multi-function terminal 149 and the DC line voltage 109 input to the primary winding 111 of a power supply 101 and/or another voltage source. In another embodiment the current flows through an external resistance or a switch coupled between the multi-function terminal 149 and another voltage source. In one embodiment, the line voltage 109 input to primary winding 111 is typically a rectified and filtered AC mains signal.

As mentioned above, in one embodiment, positive current does not flow while negative current flows, and vice versa. In one embodiment, the negative current sensor 301 and positive current sensor 305 are designed in such a way that they are not active at the same time. Stated differently, negative current sense signal 303 is not active at the same time as positive current sense signal 307 in one embodiment.

In one embodiment, the voltage at multi-function terminal 149 is fixed at a first level when negative current flows out of power supply controller 139 from multi-function terminal 149. In one embodiment, the first level is selected to be approximately 1.25 volts. In one embodiment, the voltage at multi-function terminal is fixed at a second level when positive current flows into power supply controller 139 through multi-function terminal 149. In one embodiment, the second level is selected to be approximately 2.3 volts.

In one embodiment, on/off circuitry 309 generates on/off signal 311 in response to negative current sense signal 303. In one embodiment, when the current flowing from multi-function terminal 149 through an external resistance to ground is less than a predetermined on/off threshold level, on/off circuitry 309 generates on/off signal 311 to switch off the power supply 101. In one embodiment, when the current flowing from multi-function terminal 149 is greater than a predetermined on/off threshold level, on/off circuitry 309 generates on/off signal 311 to switch on the power supply 101. In one embodiment, the magnitude of the on/off threshold level is approximately 40 to 50 microamps, including hysteresis.

In one embodiment, external current limit adjuster 313 generates external current limit adjustment signal 315 in response to negative current sense signal 303. In one embodiment, when the magnitude of the negative current flowing from multi-function terminal 149 through an external resistance or switch to ground is below a predetermined level, the current limit adjuster 313 generates an external current limit adjustment signal to limit the current flowing through power switch 147. In one embodiment, when the magnitude of the negative current flowing from multi-function terminal 149 is below a predetermined level, the current flowing through power switch 147 is limited to an amount directly proportional to the current flowing out of power supply controller 139 from multi-function terminal 149. In one embodiment, predetermined level is approximately 150 microamps. In one embodiment, if the magnitude of the negative current flowing out of power supply controller 139 from multi-function terminal 149 is greater than the predetermined level, the current flowing through power switch 147 is internally limited or clamped to a fixed safe maximum level. Therefore, the current flowing through power switch 147 is clamped to a safe value, even when multi-function terminal 149 is shorted to ground. In one embodiment, the current flowing through power switch 147 is internally limited or clamped to value of 3 amps.

In one embodiment, since the voltage at multi-function terminal 149 is fixed at a particular voltage when current flows out of power supply controller 139 through multi-function terminal 149, the current limit through power switch 147 can be accurately set externally with a single large value, low-cost, resistor externally coupled between multi-function terminal 149 and ground. By using a large external resistance, the current flowing from multi-function terminal 149 is relatively small. As mentioned above, the current flowing from multi-function terminal 149 in one embodiment is in the microamp range. Since the current flowing from multi-function terminal 149 is relatively small, the amount of power dissipated is also relatively small.

In one embodiment, multi-function terminal 149 is coupled to the DC line voltage 109 input to the primary winding 111 through an external resistance. In one embodiment, the amount of current flowing into multi-function terminal 149 represents the DC input line voltage to the power supply 101. In one embodiment, under-voltage comparator 317 generates under-voltage signal 319 in response to the resulting positive current sense signal 307. In one embodiment, when the current flowing into multi-function terminal 149 rises above a first predetermined threshold, under-voltage comparator 317 generates under-voltage signal 319 to enable the power supply. In one embodiment, when the current flowing into multi-function terminal 149 falls below a second predetermined threshold, under-voltage comparator 317 generates under-voltage signal 319 to disable the power supply. In one embodiment, the first predetermined threshold is greater than the second predetermined threshold to provide hysteresis. By providing hysteresis or a hysteretic threshold, unwanted switching on and off of the power supply 101 resulting from noise or ripple is reduced. In one embodiment, the first predetermined threshold is approximately 50 microamps and the second predetermined threshold is approximately 0 microamps. In another embodiment, a hysteretic threshold is not utilized. Thus the hysteresis is greater than or equal to zero.

In one embodiment, over-voltage comparator 321 generates over-voltage signal 323 in response to the positive current sense signal 307. In one embodiment, when the current flowing into multi-function terminal 149 rises above a third predetermined threshold, over-voltage comparator 321 generates over-voltage signal 323 to disable the power supply. In one embodiment, when the current flowing into multi-function terminal 149 falls below a fourth predetermined threshold, over-voltage comparator 321 generates over-voltage signal 323 to enable the power supply. In one embodiment, the third predetermined threshold is greater than the fourth predetermined threshold to provide hysteresis. By providing hysteresis or a hysteretic threshold, unwanted switching on and off of the power supply resulting from noise is reduced. In one embodiment, the third predetermined threshold is approximately 225 microamps and the fourth predetermined threshold is approximately 215 microamps. In one embodiment, the third and fourth predetermined thresholds are selected to be approximately four to five times greater than the first predetermined threshold discussed above for an AC mains input 103 of approximately 85 volts to 265 volts AC. In another embodiment, a hysteretic threshold is not utilized. Thus the hysteresis is greater than or equal to zero.

In one embodiment, power switch 147 is able to tolerate higher voltages when not switching. When the power supply is disabled, power switch 147 does not switch. Therefore, it is appreciated that over-voltage comparator 321 helps to protect the power supply 101 from unwanted input power surges by disabling the power switch 147.

In one embodiment, over-voltage and under-voltage comparators 321 and 317 may also be used for on/off functionality, similar to on/off circuitry 309. In particular, multi-function terminal 149 may be switchably coupled to a on/off control signal source to provide a positive current that flows into multi-function terminal 149 that cross the under-voltage or over-voltage thresholds (going above the third or below the fourth predetermined thresholds). For example, when the positive current through the multi-function pin crosses above the first predetermined threshold of the under-voltage comparator 317, the power supply will be enabled and when the positive current goes below the second predetermined threshold of the under-voltage comparator 317, the power supply is disabled. Similarly, when the positive current through the multi-function pin crosses above the third predetermined threshold of the over-voltage comparator 321, the power supply will be disabled and when the positive current goes below the fourth predetermined threshold of the over-voltage comparator 321, the power supply is enabled.

In one embodiment, maximum duty cycle adjuster 325 generates maximum duty cycle adjustment signal 327 in response to the positive current sense signal 307. In one embodiment, maximum duty cycle adjustment signal 327, which is received by control circuit 333, is used to adjust the maximum duty cycle of the switching waveform 335 used to control power switch 147. In one embodiment, the maximum duty cycle determines how long a power switch 147 can be on during each cycle. For example, if the maximum duty cycle is 50 percent, the power switch 147 can be on for a maximum of 50 percent of each cycle.

Referring briefly for example to the power supply 101 of FIG. 1, while power switch 147 is on, power is stored in the transformer core through the primary winding 111. While the power switch 147 is off, power is delivered from the transformer core to the secondary winding of the transformer in power supply 101. To delivery a given power level, for a lower DC input voltage 109, a higher duty cycle is required and for a higher DC input voltage 109, a lower duty cycle is required. In one embodiment of the present invention, maximum duty cycle adjuster 325 decreases the maximum duty cycle of power switch 147 in response to increases in the DC input voltage 109. In one embodiment, maximum duty cycle adjuster 325 increases the maximum duty cycle of power switch 147 in response to decreases in the DC input voltage 109. Stated differently, the maximum duty cycle is adjusted to be inversely proportional to the current that flows into multi-function terminal 149 in one embodiment of the present invention.

Referring back to FIG. 3, in one embodiment, the maximum duty cycle is adjusted within a range of 33 percent to 75 percent based on the amount of positive current that flows into multi-function terminal 149. In one embodiment, maximum duty cycle adjuster 325 does not begin to decrease the maximum duty cycle until the amount of current that flows into multi-function terminal 149 rises above a threshold value. In one embodiment, that threshold value is approximately 60 microamps. In one embodiment, the maximum duty cycle is not adjusted if negative current flows out of multi-function terminal 149. In this case, the maximum duty cycle is fixed at 75 percent in one embodiment of the present invention.

In one embodiment, enable/disable logic 329 receives as input on/off signal 311, under-voltage signal 319 and over-voltage signal 323. In one embodiment, if any one of the under-voltage or over-voltage conditions exist, enable/disable logic 329 disables power supply 101. In one embodiment, when the under-voltage and over-voltage conditions are removed, enable/disable logic 329 enables power supply 101. In one embodiment, power supply 101 may be enabled or disabled by starting and stopping, respectively, the switching waveform 335 at the beginning of a switching cycle just before the power switch is to be turned on. In one embodiment, enable/disable logic 329 generates enable/disable signal 331, which is received by the oscillator in the control circuit 333 to start or stop the oscillator at the beginning of a switching cycle of switching waveform 335. When enabled the oscillator will start a new on cycle of the switching waveform. When disabled the oscillator will complete the current switching cycle and stop just before the beginning of the next cycle.

In one embodiment, control circuit 333 generates switching waveform 335 to control power switch 147 in response to a current sense signal received from drain terminal 141, enable/disable signal 331, maximum duty cycle adjustment signal 327, a control signal from control terminal 145 and external current limit adjustment signal 315.

In one embodiment, the enable/disable signal can also be used to synchronize the oscillator in the control circuit to an external on/off control signal source having a frequency less than that of the oscillator. The on/off control signal can be input to the multi-function terminal through any of the three paths that generate the enable/disable signal: on/off circuitry 309, under-voltage comparator 317 or over-voltage comparator 321. As discussed, enable/disable the oscillator in the control circuit 333, in one embodiment, begins a new complete cycle of switching waveform at 335 using known techniques in response to enable/disable signal 331, which represents the on/off control signal at the multi-function input. By turning the on/off control signal "on" at the multi-function input for a fraction of the switching cycle and then "off," the oscillator is enabled to start a new complete cycle. Therefore, if the external on/off control signal has short "on" pulses at a frequency less than the oscillator in the control circuit, the oscillator will produce a switching cycle each time an on pulse is detected, thus providing a switching waveform that is synchronized to the external frequency.

In an alternate embodiment shown below in FIG. 7, the enable/disable signal 331 directly disables or turns off the power switch through the AND gate 493 when an under-voltage or over-voltage condition exists. In this embodiment, the power switch can be enabled or disabled in the middle of a cycle and consequently, synchronization of the switching waveform through a on/off control signal at the multi-function input is not provided.

Figure 4:
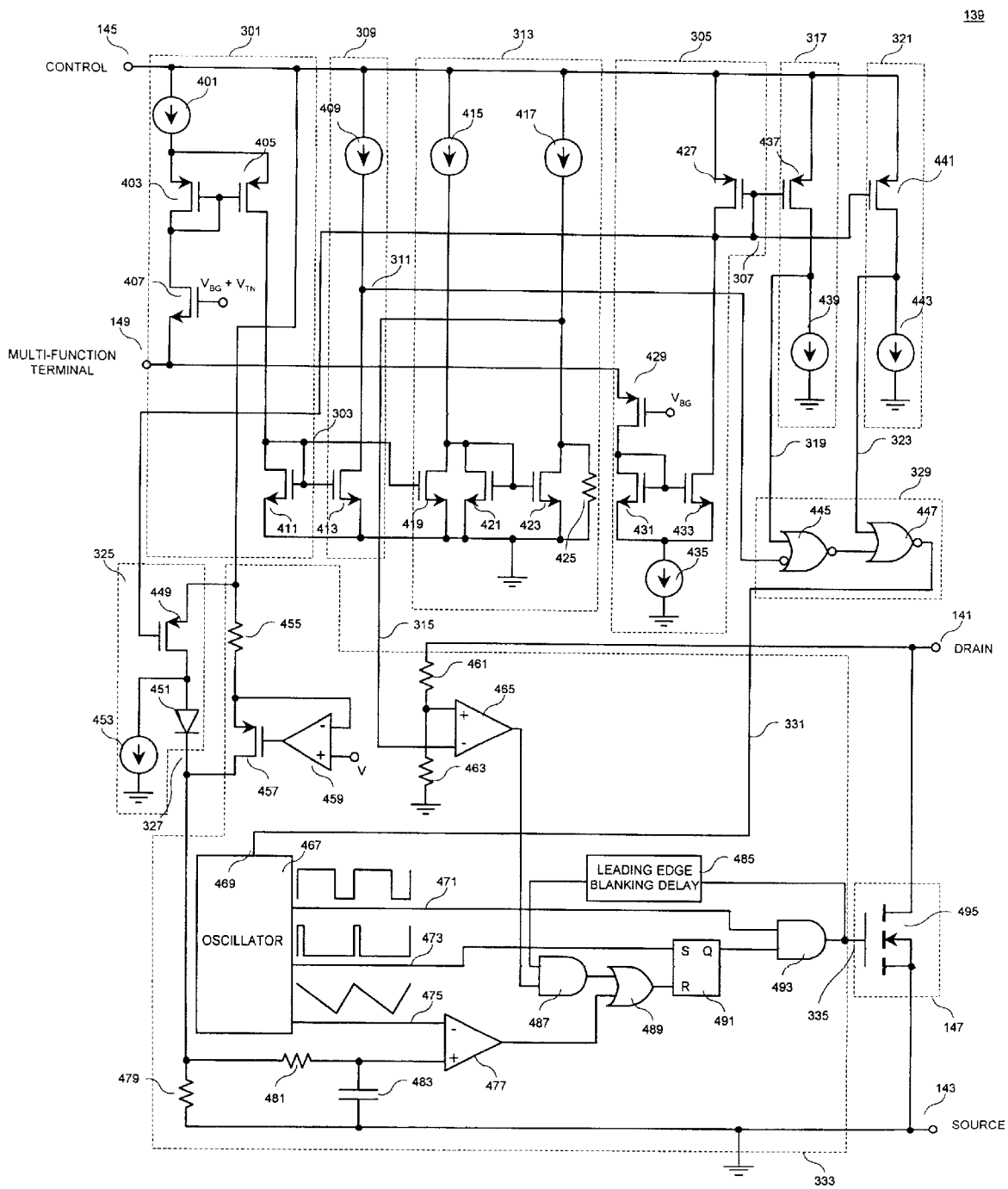
FIG. 4 is a schematic illustrating one embodiment of a power supply controller including a multi-function terminal in accordance with the teachings of the present invention.

FIG. 4 is a schematic of one embodiment of a power supply controller 139 in accordance with the teachings of the present invention. As illustrated, negative current sensor 301 includes a current source 401 coupled to control terminal 145. Transistors 403 and 405 form a current mirror coupled to current source 401. In particular, transistor 403 has a source coupled to current source 401 and a gate and drain coupled to the gate of transistor 405. The source of transistor 405 is also coupled to current source 401. Transistor 407 is coupled between the drain and gate of transistor 403 and multi-function terminal 149. In one embodiment, the gate of transistor 407 is coupled to a band gap voltage $V_{BG}$ plus a threshold voltage $V_{TN}$. In one embodiment, $V_{BG}$ is approximately 1.25 volts, $V_{TN}$ is approximately 1.05 volts and $V_{BG}+V_{TN}$ is approximately 2.3 volts. Transistors 411 and 413 also form a current mirror coupled to the drain of transistor 405. In particular, the gate and drain of transistor 411 are coupled to the drain of transistor 405 and the gate of transistor 413. In one embodiment, negative current sense signal 303 is generated at the gate and drain of transistor 411. The sources of transistors 411 and 413 are coupled to ground. In one embodiment, ground is provided through source terminal 143.

In one embodiment, on/off circuitry 309 includes a current source 409 coupled between the drain of transistor 413 and control terminal 145. In one embodiment, on/off signal 311 is generated at the drain of transistor 413.

In one embodiment, external current limit adjuster 313 includes a current source 415 coupled between control terminal 145 and the drain of transistor 419 and the gate and drain of transistor 421. The source of transistor 419 and the source of transistor 421 are coupled to ground. The gate of transistor 419 is coupled to receive negative current sense signal 303. External current limit adjuster 313 also includes a current source 417 coupled between control terminal 145 and the drain of transistor 423 and resistor 425. The source of transistor 423 and resistor 425 are coupled to ground. External current limit adjustment signal 315 is generated at the drain of transistor 423.

In one embodiment, positive current sensor 305 includes transistor 429 having a source coupled to multi-function terminal 149 and the current mirror formed with transistors 431 and 433. In particular, transistor 431 has a gate and drain coupled to the drain of transistor 429 and the gate of transistor 433. Current source 435 is coupled between ground and the sources of transistors 431 and 433. The gate of transistor 429 is coupled to band gap voltage $V_{BG}$. The drain of transistor 433 is coupled to the current mirror formed with transistors 427 and 437. In particular, the gate and drain of transistor 427 are coupled to the gate of transistor 437 and the drain of transistor 433. The sources of transistors 427 and 437 are coupled to control terminal 145. Positive current sense signal 307 is generated at the gate and drain of transistor 427.

In one embodiment, under-voltage comparator 317 includes a current source 439 coupled between the drain of transistor 437 and ground. Under-voltage signal 319 is generated at the drain of transistor 437.

In one embodiment, over-voltage comparator 321 includes a current source 443 coupled between the drain of transistor 441 and ground. Transistor 441 has a source coupled to control terminal 145 and a gate coupled to receive positive current sense signal 307. Over-voltage signal 323 is generated at the drain of transistor 441.

In one embodiment, enable/disable logic 329 includes NOR gate 445 having an input coupled to receive under-voltage signal 319 and an inverted input coupled to receive on/off signal 311. Enable/disable logic 329 also includes NOR gate 447 having an input coupled to receive over-voltage signal 323 and an input coupled to an output of NOR gate 445. Enable/disable signal 331 is generated at the output of NOR gate 447.

In one embodiment, maximum duty cycle adjuster 325 includes a transistor 449 having a source coupled to control terminal 145 and a gate coupled to receive positive current sense signal 307. Maximum duty cycle adjuster 325 also includes a current source 453 coupled between the drain of transistor 449 and ground. A diode 451 is coupled to the drain of transistor 449 to produce maximum duty cycle adjustment signal 327.

In one embodiment, power switch 147 includes a power metal oxide semiconductor field effect transistor (MOSFET) 495 coupled between drain terminal 141 and source terminal 143. Power MOSFET 495 has a gate coupled to receive a switching waveform 335 generated by pulse width modulator 333.

In one embodiment, control circuit 333 includes a resistor 455 coupled to the control terminal 145. A transistor 457 has a source coupled to resistor 455 and a negative input of a comparator 459. A positive input of comparator 459 is coupled to a voltage V, which in one embodiment is approximately 5.7 volts. An output of comparator 459 is coupled to the gate of transistor 457. The drain of transistor 457 is coupled to diode 451 and resistor 479. The other end resistor 479 is coupled to ground. A filter is coupled across resistor 479. The filter includes a resistor 481 coupled to resistor 479 and capacitor 483 coupled to resistor 481 and ground. Capacitor 483 is coupled to a positive input of comparator 477.

In one embodiment, control circuit 333 is a pulse width modulator, which has an oscillator 467 with three oscillating waveform outputs 471, 473 and 475. Oscillator 467 also includes an enable/disable input 469 coupled to receive enable/disable signal 331. In one embodiment, control circuit 333 also includes a voltage divider including resistors 461 and 463 coupled between drain terminal 141 and ground. A node between resistors 461 and 463 is coupled to a positive input of a comparator 465. A negative input of comparator 465 is coupled to receive external current limit adjustment signal 315.

In one embodiment, oscillating waveform output 471 is coupled to a first input of AND gate 493. Oscillating waveform output 473 is coupled to a set input of latch 491. Oscillating waveform output 475 is coupled to a negative input of comparator 477. An output of comparator 465 is coupled to a first input of AND gate 487. A leading edge blanking delay circuit 485 is coupled between the output of NAND gate 493 and a second input of AND gate 487. In one embodiment, there is a gate driver or a buffer between the output of the NAND gate 493 and the gate of the MOSFET (not shown). An output of AND gate 487 is coupled to a first input of OR gate 489. A second input of OR gate 489 is coupled to an output of comparator 477. An output of OR gate 489 is coupled to a reset input of latch 491. An output of latch 491 is coupled to a second input of AND gate 493. The output of AND gate 493 generates switching waveform 335.

Operation of power supply controller 139 of FIG. 4 is as follows. Beginning with negative current sensor 301, the gate of transistor 407 is fixed at $V_{BG}+V_{TN}$ in one embodiment to approximately 2.3 volts. As a result, transistor 407 sets the voltage at multi-function terminal 149 to $V_{BG}$ in one embodiment, which is approximately 1.25 volts, when current is pulled out of multi-function terminal 149. This current may be referred to as negative current since the current is being pulled out of power supply controller 139. In one embodiment, transistor 407 is sized such that it operates with a current density resulting in a voltage drop between the gate and source that is close to $V_{TN}$, wherein the $V_{TN}$ is the threshold of the N channel transistor 407, when negative current flows from multi-function terminal 149.

When an external resistor (not shown) is coupled from multi-function terminal 149 to ground, the negative current flowing through the external resistor will therefore be $V_{BG}$ divided by the value of the external resistor in accordance with Ohm's law. This negative current flowing out from multi-function terminal 149 passes through transistors 403 and is mirrored on to transistor 405. Current source 401 limits the negative current sourced by multi-function terminal 149. Therefore, even if multi-function terminal 149 is short-circuited to ground, the current is limited to a current less than the current supplied by current source 401. This current is less than the current source 401 by an amount that flows through the transistor 405. In one embodiment, the negative current that can be drawn from the multi-function terminal is limited to 200 microamps by the current source 401. In one embodiment, if more negative current than current source 401 is able to supply is pulled from multi-function terminal 149, the voltage at multi-function terminal 149 collapses to approximately 0 volts.

The current that flows through transistor 403 is mirrored to transistor 405. The current that flows through transistors 405 and 411 is the same since they are coupled in series. Since transistors 411 and 413 form a current mirror, the current flowing through transistor 413 is proportional to the negative current flowing through multi-function terminal 149. The current flowing through transistor 413 is compared to the current provided by current source 409. If the current through transistor 413 is greater than the current supplied by current source 409, the signal at the drain of transistor 413 will go low, which in one embodiment enables the power supply. Indeed, on/off signal 311 is received at an inverted input of NOR gate 445. Thus, when on/off signal 311 is low, the power supply is enabled. Therefore, by having a negative current greater than a particular threshold value, the power supply of the present invention is enabled in one embodiment. In one embodiment, the magnitude of that particular threshold value is approximately 50 microamps.

As mentioned above, the current flowing through transistor 411 is proportional to the negative current flowing out from multi-function terminal 149. As illustrated, transistor 419 also forms a current mirror with transistor 411. Therefore, the current flowing through transistor 419 is proportional to the current flowing through transistor 411. The current flowing through transistor 421 is the difference between the current supplied by current source 415 and the current flowing through transistor 419. For example, assume that the current supplied by current source 415 is equal to A. Assume further that the current flowing through transistor 419 is equal to B. In this case, the current flowing through transistor 421 is equal to A–B.

As illustrated, transistor 423 forms a current mirror with transistor 421. Therefore, the current flowing through transistor 423 is proportional to the current flowing through transistor 421. Continuing with the example above and assuming further that transistors 421 and 423 are equal in size, the current flowing through transistor 423 is also equal to A–B. Assuming further that current source 417 supplies a current equal to the current supplied by current source 415, which is assumed to be equal to A, then the current flowing through resistor 425 would be equal to A–(A–B), which is equal to B.

Therefore, the current flowing through resistor 425 is proportional to the current flowing through transistor 419, which is proportional to the current flowing through transistor 411, which is proportional to the negative current flowing out from multi-function terminal 149. Note that if the current flowing through transistor 419 is greater than the current supplied by current source 415, the current flowing through transistor 421 would be zero because the voltage at the drains of transistors 419 and 421 would collapse to approximately zero volts. This would result in the current flowing through transistor 423 to be zero. Thus, the current through resistor 425 cannot be greater than the current supplied by current source 417. However, as long as B is less than A, the current that flows through resistor 425 is equal to B. If B rises above A, the current that flows through resistor 425 is equal to A.

In one embodiment, resistor 425 is fabricated using the same or similar types of processes and diffusions or doped regions used in fabricating power MOSFET 495. As a result, the on resistance of resistor 425 follows or tracks the on resistance of power MOSFET 495 through varying operating conditions and processing variations.

The voltage across resistor 425 is reflected in external current limit adjuster signal 315, which is input to the negative input of comparator 465. In one embodiment, the negative input of comparator 465 is the threshold input of comparator 465. Therefore, the negative input of comparator 465 receives a voltage proportional to the negative current flowing out of multi-function terminal 149 multiplied by the resistance of resistor 425.

The positive input of comparator 465 is coupled to drain terminal 141 through resistor 461 of the voltage divider formed by resistor 461 and resistor 463. Therefore, the positive input of comparator 465 senses a voltage proportional to the drain current of power MOSFET 495 multiplied by the on resistance of power MOSFET 495.

When the voltage at the positive terminal of comparator 465 rises above the voltage provided by external current limit adjuster signal 315 to the negative terminal of comparator 465, the output of comparator 465 is configured to reset latch 491 through AND gate 487 and OR gate 489. By resetting latch 491, the on portion of a cycle of waveform 335 received at the gate of power MOSFET 495 is masked or cut short, which results in turning off power MOSFET 495 when the amount of current flowing through power switch 147 rises above the threshold.

In one embodiment, AND gate 487 also receives input from leading edge blanking delay circuitry 485. In one embodiment, leading edge blanking delay circuitry 485, using known techniques, temporarily disables current limit detection at the start, or during the leading edge portion, of an on transition of power MOSFET 495.

As shown in the embodiment illustrated in FIG. 4, latch 491 is set at the beginning of each cycle by switching waveform output 473. One way that latch 491 is reset, thereby turning off power MOSFET 495, is through the output of comparator 465. Another way to reset latch 491 is through the output of comparator 477, which will be discussed below in connection with maximum duty cycle adjuster 325.

With regard to positive current sensor 305, the gate of transistor 429 is coupled to the band gap voltage $V_{BG}$. In one embodiment, transistor 429 is sized such that it operates with a current density resulting in a drop between the source and gate close to $V_{TP}$, which is threshold of the P channel transistor 429, when positive current flows into multi-function terminal 149. In one embodiment, current that flows into multi-function terminal 149 is referred to as positive current since the current is being fed into the power supply controller 139. As a result, the voltage at multi-function terminal 149 is fixed at approximately $V_{BG}+V_{TP}$ when positive current flows into multi-function terminal 149.

The gate voltages on the transistors 407 and 429 chosen in the embodiment discussed above are such that only one of transistors 407 and 429 are switched on at a time depending on the polarity of the current at the multi-function terminal. Stated differently, if transistor 407 is on, transistor 429 is off. If transistor 429 is on, transistor 407 is off. As result, if negative current sensor 301 is on, positive current sensor 305 is isolated from multi-function terminal 149. If positive current sensor 305 is on, negative current sensor 301 is isolated from multi-function terminal 149. Therefore, if there is negative current flowing through multi-function terminal 149, positive current sensor 305 is disabled. If there is positive current flowing through multi-function terminal 149, negative current sensor 301 is disabled.

In one embodiment, the positive current that flows into transistor 429 flows through transistor 431 since they are coupled in series. The positive current through multi-function terminal 149 flows into and is limited by current source 435. In one embodiment, if the positive current through multi-function terminal 149 is greater than an amount that current source 435 can sink minus the current in transistor 433, then the voltage at multi-function terminal 149 will rise and is clamped either by the circuitry driving the current or by the standard clamping circuitry that is used for protection purposes on external terminals such as the multi-function terminal, of a power supply controller. As shown, transistors 431 and 433 form a current mirror. Therefore, the current flowing through transistor 433 is proportional to the positive current that flows through transistor 431. The current that flows through the transistor 433 flows to transistor 427 since they are coupled in series. As shown, the gate of transistor 427 is coupled to the drain of transistor 427, which generates positive current sense signal 307.

Transistors 427 and 437 form a current mirror since the gate and drain of transistor 427 are coupled to the gate of transistor 437. Therefore, the current flowing through transistor 437 is proportional to the current flowing through transistor 427, which is proportional to the positive current. Current source 439 provides a reference current, which is compared to the current that flows through transistor 437. If the current flowing through transistor 437 rises above the current provided by current source 439, then the voltage at the drain of transistor 437, which is the under-voltage signal 319, goes high. When under-voltage signal 319 goes high and the output of NOR gate 445 will go low, indicating that there is no under-voltage condition.

Transistors 427 and 441 also form a current mirror since the gate and drain of transistor 427 are coupled to the gate of transistor 441. Therefore, the current flowing through transistor 441 is proportional to the current flowing through the transistor 427, which is proportional to the positive current. Current source 443 provides a reference current, which is compared to current that flows through transistor 441. As long as the current flowing through transistor 441 stays below the current provided by current source 443, then the voltage at the drain of transistor 441, which is the over-voltage signal 323, remains low. When over-voltage signal 323 remains low, the output of NOR gate 447 remains high assuming that there was no under-voltage condition indicated by under-voltage signal 319 and no remote off condition indicated by on/off signal 311.

The output of NOR gate 447 is enable/disable signal 331. In one embodiment, enable/disable signal 331 is high if on/off signal 311 is low, or under-voltage signal 319 is high and over-voltage signal 323 is low. Otherwise, enable/disable signal 331 is low.

In one embodiment, the oscillator 467 receives enable/disable signal 331 at the start/stop input 469. In one embodiment, oscillator 467 generates oscillating waveforms at oscillating waveform outputs 471, 473 and 475 while enable/disable signal 331 is high or active. In one embodiment, oscillator 467 does not generate the oscillating waveforms at oscillating waveform outputs 471, 473 and 475 while enable/disable signal 331 is low or in-active. In one embodiment, oscillator 467 begins generating oscillating waveforms starting with new complete cycles on a rising edge of enable/disable signal 331. In one embodiment, oscillator 467 completes existing cycles of the oscillating waveforms generated at oscillating waveform outputs 471, 473 and 475 before stopping the waveforms in response to a falling edge of enable/disable signal 331. That is, oscillator 467 stops generating the waveforms at a point just before the start of an on time of power switch of the next cycle in response to a falling edge of enable/disable signal 331.

In one embodiment, control terminal 145 supplies power to the circuitry of power supply controller 139 and also provides feedback to modulate the duty cycle of switching waveform 335. In one embodiment, control terminal 145 is coupled to the output of the power supply 101 through a feedback circuit to regulate the output voltage of the power supply 101. In one embodiment, an increase in the output voltage of power supply 101 results in the reduction in the duty cycle of switching waveform 335 through feedback received through control terminal 145. Therefore, if the regulation level of the output parameter of power supply 101 that is being controlled, such as output voltage or current or power, is exceeded during operation, additional feedback current is received through control terminal 145. This feedback current flows through resistor 455 and through a shunt regulator formed by transistor 457 and comparator 459. If no feedback current or control terminal current in excess of supply current is received through control terminal 145, the current through transistor 457 is zero. If the current through transistor 457 is zero, and assuming for the time being that there is no current through the diode 451, the current through resistor 479 is zero. If there is no current flowing through resistor 479, then the voltage drop across resistor 479 is zero.

If there is no voltage drop across resistor 479, there is no voltage drop across capacitor 483. As a result, the output of comparator 477 will remain low. If the output of comparator 477 remains low, and assuming for the time being that the output of AND gate 487 remains low, the output of latch 491 will remain high. In this case, the maximum duty cycle signal, which is produced by oscillator waveform output 471, will be generated at the output of AND gate 493. Thus, switching waveform 335 will have the maximum duty cycle produced by oscillator waveform output 471.

Therefore, when the voltage drop across resistor 479 remains at zero, the maximum duty cycle produced at oscillator waveform output 471 is not limited, assuming that the output of AND gate 487 remains low. This is because latch 491 is not reset through the output of comparator 477. However, when the feedback current or control terminal current in excess to the supply current is received through control terminal 145, this feedback current flows through transistor 457. As the amount of current flowing through the transistor 457 increases, the voltage drop across resistor 479 increases correspondingly. As a voltage drop across resistor 479 increases, the voltage drop across capacitor 483 will increase. In any given cycle, when the voltage on the oscillating waveform output 475 crosses below the voltage across the capacitor 483 the output of the comparator will go high and terminate the on-time of the switching waveform 335 or turn off the power switch 495. As a result, the duty cycle (on time as a fraction of the cycle time) of the switching waveform 335 decreases with increase in voltage drop across resistor 479.

In one embodiment, the oscillating waveform at oscillating waveform output 475 is a sawtooth waveform having a duty cycle and period equal to the maximum duty cycle waveform generated at oscillating waveform output 471. As the voltage drop across resistor 479 increases, the output of comparator 477 will go high closer to the beginning of each cycle. When the output of comparator 477 goes high, latch 491 will be reset through NOR gate 489. When latch 491 is reset, the on time of the of switching waveform 335 is terminated for that particular cycle and switching waveform 335 remains low for the remainder of that particular cycle. Latch 491 will not be set again until the beginning of the next cycle through switching waveform output 473, assuming that there is a high or active enable/disable signal 331.

Referring now to maximum duty cycle adjuster signal 325, transistor 449 includes a source coupled to control terminal 145 and a gate coupled the gate and drain of transistor 427 to receive positive current sense signal 307. Transistor 449 and transistor 427 also form a current mirror. Therefore, the current flowing through transistor 449 is proportional to the current flowing through transistor 427, which is proportional to the positive current flowing into multi-function terminal 149. The current that flows through diode 451 is the difference between the current that flows through transistor 449 and the current that flows into current source 453. The current that flows through current source 453 is set such that current will not begin to flow through diode 451 until the current flowing through transistor 449 rises above a threshold. In one embodiment, the above threshold value is chosen such that the maximum duty cycle is not reduced until the positive current flowing into multi-function terminal 149 rises above the threshold used for under-voltage comparison. In one embodiment, the threshold positive current used for under-voltage comparison is approximately 50 microamps and the threshold positive current used for maximum duty cycle adjustment is approximately 60 microamps.

When current begins to flows through diode 451, that current will be combined with current that flows through transistor 457. In one embodiment, the current that flows through diode 451 is maximum duty cycle adjustment signal 327. The current flowing through transistor 457 and diode 451 will flow through resistor 479. As discussed in detail above, current that flows through resistor 479 will result in the voltage drop across resistor 479, which results in a reduction in the maximum duty cycle of switching waveform 335. As the current that flows through resistor 479 increases, the maximum duty cycle of switching waveform 335 will be decreased.

Figure 5:
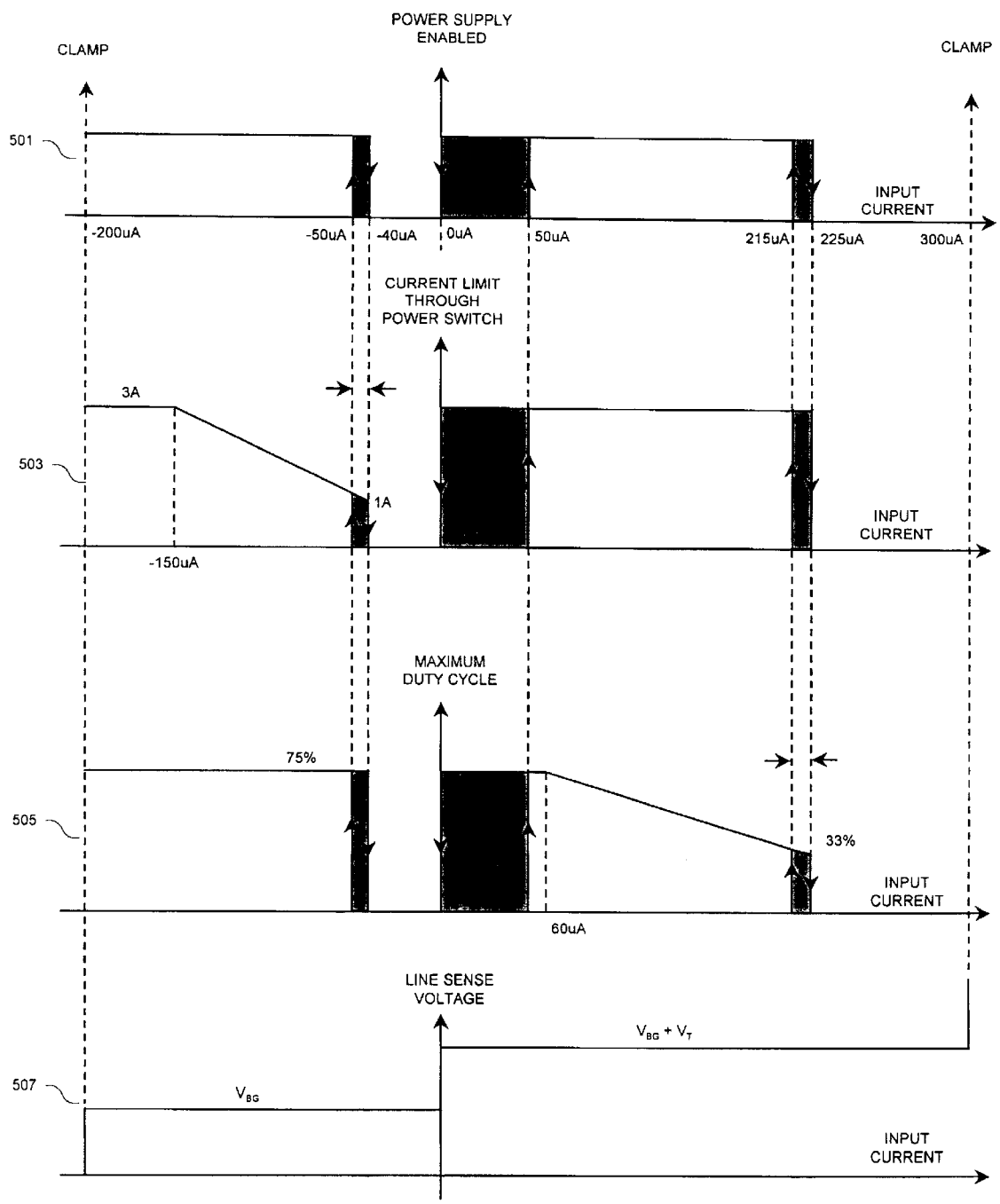
FIG. 5 is a diagram illustrating one embodiment of currents, voltages and duty cycles in relation to current through a multi-function terminal of a power supply controller in accordance with teachings of the present invention.

FIG. 5 is a diagram illustrating some of the currents, voltages and duty cycles associated with the power supply controller 139 in accordance with teachings of the present invention. In particular, diagram 501 illustrates when the power supply is enabled in relation to the input current of multi-function terminal 149. The x-axis represents the positive or negative current flowing into or out of multi-function terminal 149. As illustrated, as positive input current rises from zero and crosses over 50 microamps, power supply controller 139 in one embodiment is enabled. At this time, an under-voltage condition is removed. If the current is above 50 microamps but then falls below zero microamps, power supply controller 139 is disabled. At this time, an under-voltage condition is detected. The difference between 50 microamps and zero microamps provides hysteresis, which provides for more stable operation during noise or ripple conditions in the input current.

As the input current rises above 225 microamps, the power supply is disabled. At this time, an over-voltage condition is detected. When the input current falls back below 215 microamps, the power supply is re-enabled. At this time, the over-voltage condition is removed. The difference between 225 microamps and 215 microamps provides hysteresis, which provides for more stable operation during noise or ripple conditions in the input current.

Continuing with diagram 501, when the negative current that flows out from multi-function terminal 149 rises in magnitude to a level above 50 microamps, which is illustrated as −50 microamps in FIG. 5, the power supply is enabled. At this time, the on/off feature of the present invention turns on the power supply. When the negative current falls in magnitude to a level below 40 microamps, which is illustrated as −40 microamps in FIG. 5, the power supply is disabled. At this time, the on/off feature of the present invention turns off the power supply. The difference between −50 microamps and −40 microamps provides hysteresis, which provides for more stable operation during noise or ripple conditions in the input current.

It is worthwhile to note that in one embodiment the positive input current is clamped at 300 microamps and that the negative input current is clamped at 200 microamps. The positive input current would be clamped at 300 microamps when, for example, the multi-function terminal 149 is short-circuited to a supply voltage. The negative input current would be clamped at 200 microamps when, for example, the multi-function terminal is short-circuited to ground.

In diagram 503, the current limit through power switch 147 as adjusted by the present invention is illustrated. Note that the hysteresis of the under-voltage and over-voltage conditions are illustrated from zero microamps to 50 microamps and from 215 microamps to 225 microamps, respectively. In one embodiment, when positive input current is provided into multi-function terminal 149 and there is neither an under-voltage condition nor an over-voltage condition, the current limit through power switch 147 is 3 amps. However, when negative current flows out from multi-function terminal 149, and the magnitude of the negative current rises above 50 microamps, which is illustrated as −50 microamps in FIG. 5, the current limit through power switch 149 is approximately 1 amp. As the magnitude of the negative current rises to 150 microamps, which is illustrated as −150 microamps in FIG. 5, the current limit through power switch 149 rises proportionally with the negative current to 3 amps. After the magnitude of the negative current rises above 150 microamps, the current limit of the power switch 149 remains fixed at 3 amps. Note that there is also the on/off hysteresis between −50 microamps and −40 microamps in diagram 503.

Diagram 505 illustrates the maximum duty cycle setting of power supply controller 139 in relation to the input current. Note that the hysteresis from −50 microamps to −40 microamps, from zero microamps to 50 microamps and from to 215 microamps to 225 microamps as discussed above is included. In the embodiment illustrated in diagram 505, the maximum duty cycle is fixed at 75 percent until a positive input current of 60 microamps is reached. As the input current continues to increase, the maximum duty cycle continues to decrease until an input current of 225 microamps is reached, at which time the maximum duty cycle has been reduced to 33 percent. As illustrated, between 60 microamps and 225 microamps, the maximum duty cycle is inversely proportional to the positive input current. Note that when negative current flows through multi-function terminal 149, and when the power supply is enabled, the maximum duty cycle in one embodiment is fixed at 75 percent.

Diagram 507 illustrates the voltage at multi-function terminal, which is labeled in diagram 507 as line sense voltage, in relation to the input current. When negative current is flowing from multi-function terminal 149, the voltage at multi-function terminal 149 is fixed at the band gap voltage $V_{BG}$, which in one embodiment is 1.25 volts. When positive current is flowing into multi-function terminal 149, the voltage at multi-function terminal is fixed at the band gap voltage $V_{BG}$ plus a threshold voltage $V_{TP}$, which in one embodiment sum to 2.3 volts. In the event that a negative current having a magnitude of more than 200 microamps is attempted to be drawn out of the multi-function terminal 149, the voltage at multi-function terminal 149 drops to approximately zero volts. In the event that a positive current of more than 300 microamps flows into multi-function terminal 149, the voltage at multi-function terminal 149 rises. In this case, the voltage will be limited by either by a standard clamp used at the multi-function terminal for the purpose of protection or by the external circuitry driving the multi-function terminal, whichever is lower in voltage.

It is appreciated that the currents, voltages, duty cycle settings and hysteresis settings described in connection with the present invention are given for explanation purposes only and that other values may be selected in accordance with teachings of the present invention. For example, in other embodiments, non hysteretic thresholds may be utilized. Thus the hysteresis values may be greater than or equal to zero.

Figure 6A:
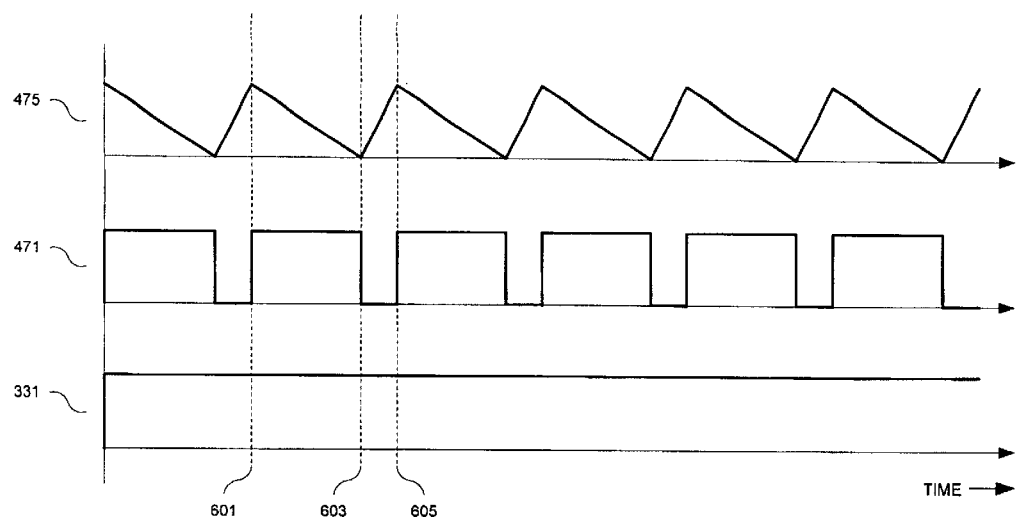
FIG. 6A is a diagram illustrating one embodiment of timing diagrams of switching waveforms of a power supply controller including a multi-function terminal in accordance with teachings of the present invention.

FIG. 6A is timing diagram illustrating one embodiment of some of the waveforms of a power supply controller in accordance with teachings of the present invention. Referring to both FIGS. 4 and 6A, oscillating waveform output 475 of oscillator 467 generates a sawtooth waveform, which is received by comparator 477. Oscillating waveform output 471 of oscillator 467 generates a maximum duty cycle signal, which is received by AND gate 493. Enable/disable signal 331, which is received at enable/disable input 469 of oscillator 467, is also illustrated. In FIG. 6A, the enable/disable signal 331 is active. Therefore, the sawtooth waveform of oscillating waveform output 475 and the maximum duty cycle waveform of oscillating waveform output 471 are generated. Note that the sawtooth waveform and the maximum duty cycle waveform have the same frequency and period. One cycle of each of these waveform occurs between time 601 and time 605. The peak of the sawtooth waveform occurs at the same time as the rising edge of the maximum duty cycle waveform. This aspect is illustrated at time 601 and at time 605. The lowest point of the sawtooth waveform occurs at the same time as the falling edge of the maximum duty cycle waveform. This aspect is illustrated at time 603.

Figure 6B:
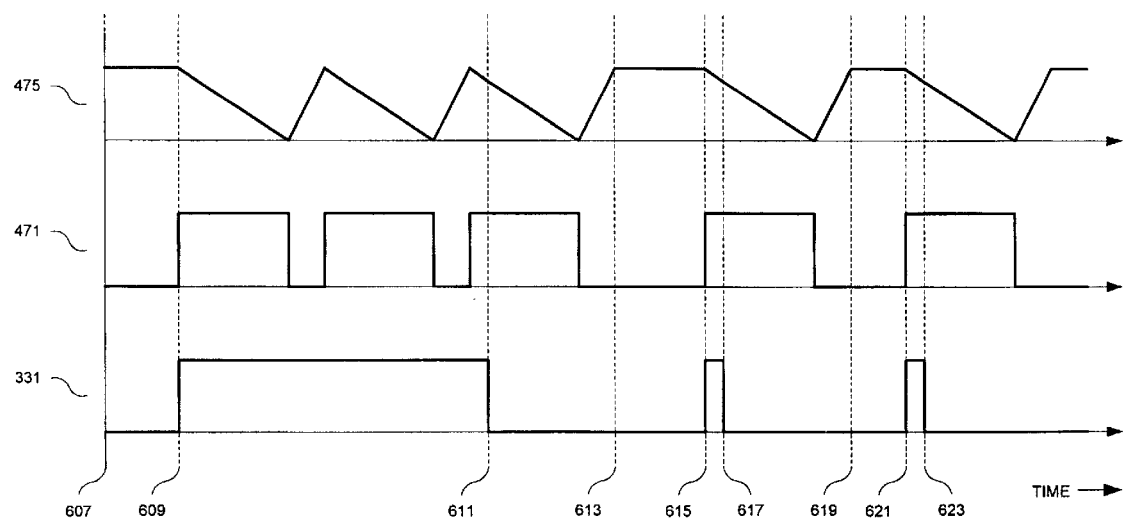
FIG. 6B is a diagram illustrating another embodiment of timing diagrams of switching waveforms of the power supply controller including a multi-function terminal in accordance with teachings of the present invention.

Referring now to FIG. 6B, a timing diagram illustrating another embodiment of the waveforms of a power supply controller in accordance with teachings of the present invention is shown. From time 607 to time 609, the enable/disable signal 331 is low or inactive. In one embodiment, a low enable/disable signal 331 disables the power supply. A high or active enable/disable signal 331 enables the power supply. At time 609, the rising edge of enable/disable signal 331 occurs. At this time, oscillating waveform outputs 475 and 471 begin generating the sawtooth waveform and maximum duty cycle waveform, respectively. Note that a new complete cycle of each of these waveforms is generated in response to the rising edge of enable/disable signal 331 at time 609.

From time 609 to time 611, enable/disable signal 331 remains high or active. Thus, during this time, the sawtooth waveform and maximum duty cycle waveform are continuously generated.

At time 611, a falling edge of enable/disable signal 331 occurs. Before oscillator 467 discontinues generating the sawtooth waveform and the maximum duty cycle waveform, the existing cycles of each of these waveforms are allowed to complete. Stated differently, generation of the sawtooth waveform and the maximum duty cycle waveform is discontinued at a point just before the start of the on-time of the switching waveform 335 or the on- time of the power switch of the next cycle. This point in time is illustrated in FIG. 6B at time 613. Note that after time 613, the sawtooth waveform remains inactive at a high value and the maximum duty cycle waveform remains inactive at a low value.

At time 615, another rising edge of enable/disable signal 331 occurs. Therefore, the sawtooth waveform and the maximum duty cycle waveform are generated beginning at a new complete cycle of each waveform. As illustrated in FIG. 6B, a falling edge of enable/disable signal 331 occurs at time 617, which is immediately after the rising edge. However, the sawtooth waveform and maximum duty cycle waveforms are allowed to complete their then existing cycles. This occurs at time 619. After time 619, the waveforms remains inactive as shown during the time between time 619 and time 621, which is when another rising edge of enable/disable signal 331 occurs. At time 621, another new complete cycle of the sawtooth waveform and the maximum duty cycle waveform are generated. Since enable/disable signal 331 is deactivated at time 623, which occurs during a cycle of the sawtooth waveform and the maximum duty cycle waveform, these waveforms are deactivated after fully completing their respective cycles. Thus, by pulsing the on/off control signal at the multi-function terminal it is possible to synchronize the oscillator to the on/off pulse frequency.

Figure 7:
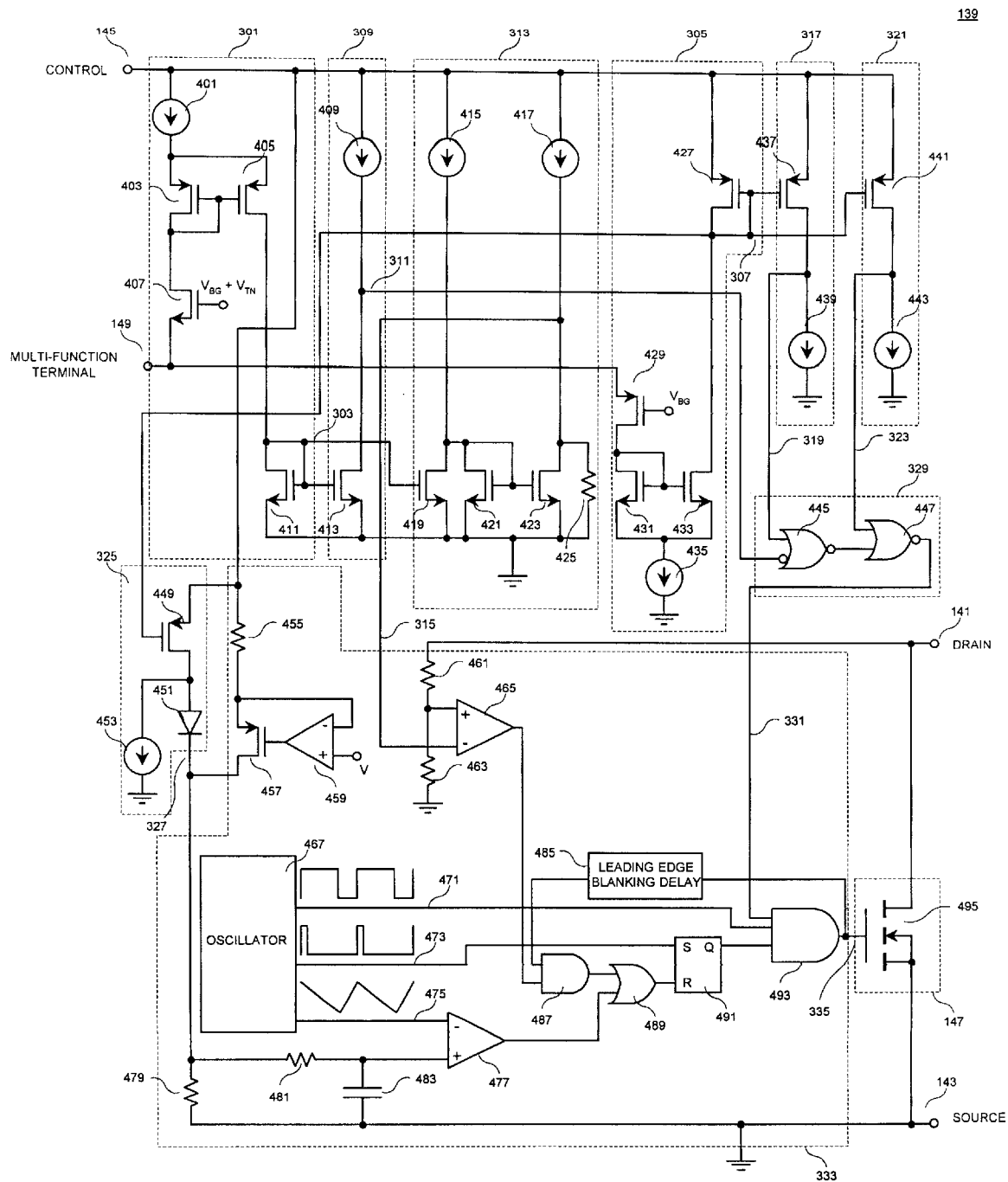
FIG. 7 is a schematic illustrating another embodiment of a power supply controller including a multi-function terminal in accordance with the teachings of the present invention.

FIG. 7 is a schematic of another embodiment of a power supply controller 139 in accordance with the teachings of the present invention. The power supply controller schematic shown in FIG. 7 is similar to the power supply controller schematic discussed above in FIG. 4. The primary difference between the power supply controller of FIGS. 4 and 7 is that oscillator 467 of FIG. 7 does not have an enable/disable input 469 coupled to receive enable/disable signal 331. As shown in the embodiment depicted in FIG. 7, the enable/disable signal 331 is used to directly gate the switching waveform at the input of AND gate 493. In this embodiment, the oscillator 467 is running all the time and switching waveform 335 will be gated on and off at any point in the cycle in response to the enable/disable signal 331.

Figure 8:
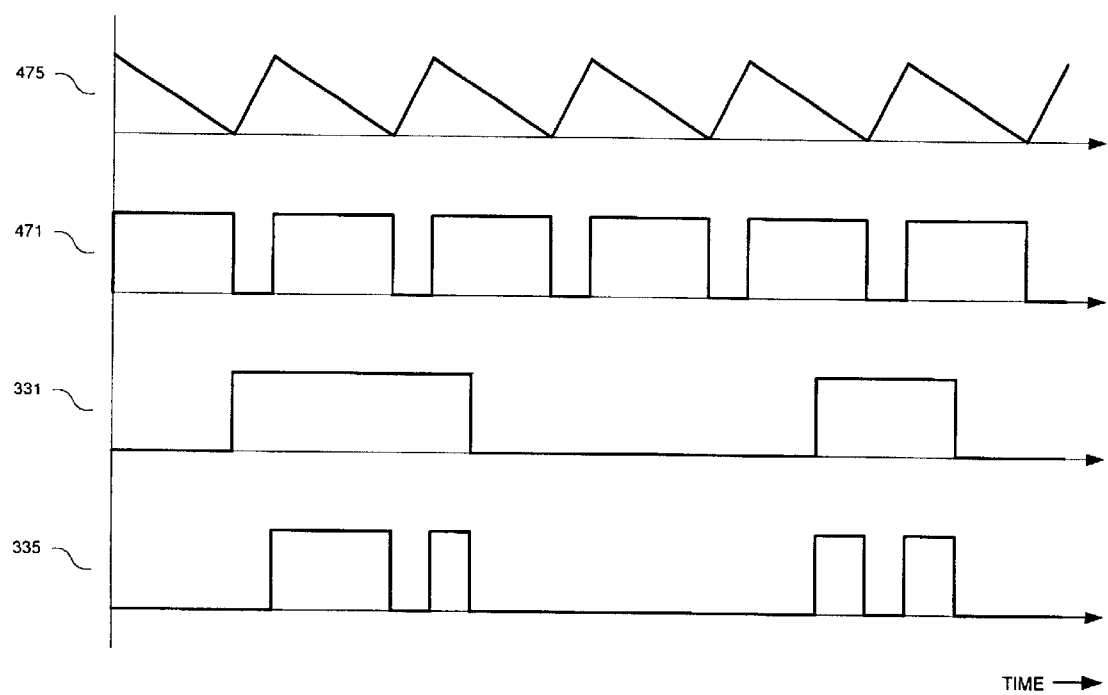
FIG. 8 is a diagram illustrating another embodiment of timing diagrams of switching waveforms of the power supply controller including a multi-function terminal in accordance with teachings of the present invention.

To illustrate, FIG. 8 shows one embodiment of timing diagrams of switching waveforms of the power supply controller illustrated in FIG. 7. Referring to both FIGS. 7 and 8, oscillating waveform output 475 of oscillator 467 generates a sawtooth waveform, which is received by comparator 477. Oscillating waveform output 471 of oscillator 467 generates a maximum duty cycle signal, which is received by AND gate 493. Enable/disable signal 331, which is received by AND gate 493, and the output of AND gate 493, which is switching waveform 335, are also illustrated. In FIG. 8, the enable/disable signal 331 is active only some of the time. Therefore, the switching waveform 335 is switching only during those portions of time that the enable/disable signal 331 is active. When the enable/disable signal 331 is not active, switching waveform 335 does not switch.

In the foregoing detailed description, the method and apparatus of the present invention has been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. A power supply controller, comprising:
   a power switch having a drain terminal, a source terminal and a gate, the drain terminal coupled to a primary winding of a power supply and the source terminal coupled to ground;
   a control circuit coupled to a control terminal, the drain terminal and the gate of the power switch, the control terminal coupled to an output of the power supply, the control circuit to generate a switching waveform to control the power switch;
   multi-function circuitry coupled between a multi-function terminal and the control circuit, the switching waveform generated in response to the drain terminal, the control terminal and the multi-function terminal.

2. The power supply controller of claim 1 wherein the multi-function circuitry comprises:
   a negative current sensor coupled to the multi-function terminal, the negative current sensor to generate a negative current sense signal in response to the multi-function terminal if a voltage at the multi-function terminal is less than a first voltage, the negative current sensor isolated from the multi-function terminal if the voltage at the multi-function terminal is greater than the first voltage;
   a positive current sensor coupled to the multi-function terminal, the positive current sensor to generate a positive current sense signal in response to the multi-function terminal if the voltage at the multi-function terminal is greater than a second voltage, the positive current sensor isolated from the multi-function terminal if the voltage at the multi-function terminal is less than the second voltage, wherein the second voltage is greater than the first voltage, the switching waveform generated in response to the negative current sense signal and the positive current sense signal.

3. The power supply controller of claim 2 wherein the multi-function circuitry further comprises on/off circuitry coupled to receive the negative current sense signal and coupled to the control circuit, the on/off circuitry to control the control circuit to start and to stop the switching waveform in response to the multi-function terminal.

4. The power supply controller of claim 2 wherein the multi-function circuitry further comprises external current limit adjuster circuitry coupled to receive the negative current sense signal and coupled to the control circuit, the external current limit adjuster circuitry control the control circuit to adjust a current limit of the power switch in response to a current received at the multi-function terminal.

5. The power supply controller of claim 2 wherein the multi-function circuitry further comprises under-voltage comparator circuitry coupled to receive the positive current sense signal and coupled to the control circuit, the under-voltage comparator circuitry to control the control circuit to start and to stop the switching waveform in response to a current received at the multi-function terminal.

6. The power supply controller of claim 2 wherein the multi-function circuitry further comprises over-voltage comparator circuitry coupled to receive the positive current sense signal and coupled to the control circuit, the over-voltage comparator circuitry to control the control circuit to start and to stop the switching waveform in response to a current received at the multi-function terminal.

7. The power supply controller of claim 2 wherein the multi-function circuitry further comprises maximum duty cycle adjuster circuitry coupled to receive the positive current sense signal and coupled to the control circuit, the maximum duty cycle adjuster circuitry to adjust the maximum duty cycle of the switching waveform in response to a current received at the multi-function terminal.

8. The power supply controller of claim 1 wherein a voltage at the multi-function terminal is substantially equal to a first constant voltage if there is a negative current flowing through the multi-function terminal.

9. The power supply controller of claim 1 wherein a voltage at the multi-function terminal is substantially equal to a second constant voltage if there is a positive current flowing through the multi-function terminal.

10. A method for controlling a power supply, comprising:
    generating a switching waveform to control a power switch of a power supply controller coupled to a primary winding of the power supply;
    adjusting the switching waveform in response to a drain terminal of the power supply controller coupled to the primary winding, a voltage at the drain terminal indicating a current flowing through the power switch;
    adjusting the switching waveform in response to a control terminal of the power supply controller coupled to an output of the power supply; and
    adjusting the switching waveform in response to a current flowing through a multi-function terminal of the power supply controller.

11. The method of claim 10 wherein adjusting the switching waveform in response to the current flowing through the multi-function terminal comprises generating a negative current sense signal if the current flowing through the multi-function terminal flows out of the power supply controller from the multi-function terminal.

12. The method of claim 11 further comprising coupling the multi-function terminal to ground through a resistance.

13. The method of claim 11 further comprising switchably coupling the multi-function terminal to ground.

14. The method of claim 10 wherein adjusting the switching waveform in response to the current flowing through the multi-function terminal comprises generating a positive current sense signal if the current flowing through the multi-function terminal flows into the power supply controller through the multi-function terminal.

15. The method of claim 14 further comprising starting and stopping the switching waveform in response to the positive current sense signal.

16. The method of claim 14 further comprising reducing a maximum duty cycle of the switching waveform in response to the positive current sense signal.

17. The method of claim 14 further comprising coupling the multi-function terminal to an input voltage of the power supply through a resistance.

18. The method of claim 14 further comprising switchably coupling the multi-function terminal to a first potential.

19. The method of claim 11 further comprising starting and stopping the switching waveform in response to the negative current sense signal.

20. The method of claim 11 further comprising controlling the switching waveform to limit the current flowing through the power switch in response to the negative current sense signal.

21. The power supply controller, comprising:
a power switch coupled between a drain terminal and a source terminal, the drain terminal to be coupled to a primary winding of a power supply;
a control circuit coupled to the power switch, the drain terminal and a control terminal, the control terminal to be coupled to an output of the power supply;
a negative current sensor coupled to a multi-function terminal;
a positive current sensor coupled to the multi-function terminal;
a on/off circuit coupled between the negative current sensor and the control circuit;
an external current limit adjuster coupled between the negative current sensor and the control circuit;
an under-voltage comparator coupled between the positive current sensor and the control circuit;
an over-voltage comparator coupled between the positive current sensor and the control circuit; and
a maximum duty cycle adjuster coupled between the positive current sensor and the control circuit.

22. The power supply controller of claim 21 further comprising enable/disable logic coupled to an output of the under-voltage comparator, to an output of the over-voltage comparator, to an output of the on/off circuit and to an input of the control circuit.

23. The power supply controller of claim 22 wherein the enable/disable logic comprises:
a first NOR gate having a first input coupled to the under-voltage comparator and having an inverted second input coupled to the on/off circuit; and
a second NOR gate having a first input coupled to the over-voltage comparator and having a second input coupled to an output of the first NOR gate.

24. The power supply controller of claim 22 wherein the control circuit comprises:
a second resistor coupled to the control terminal;

a sixteenth transistor having a source coupled to the second resistor and a drain coupled to the maximum duty cycle adjuster;
a first comparator having a first input coupled to the source of the sixteenth transistor and the second resistor, the first comparator having a second input coupled to a third voltage;
a third resistor coupled to the drain of the sixteenth transistor;
a fourth resistor coupled to the drain of the sixteenth transistor and the third resistor;
a first capacitor coupled to the fourth resistor;
an oscillator having an enable/disable input and first, second and third switching waveform outputs, the enable/disable input of the oscillator coupled to the enable/disable logic;
a fifth resistor coupled to the drain terminal;
a sixth resistor coupled to the fifth resistor;
a second comparator having a first input coupled to the fifth and sixth resistors and a second input coupled to the external current limit adjuster;
a third comparator having a first input coupled to the third switching waveform output and having a second input coupled to the first capacitor and the fourth resistor;
a leading edge blanking delay circuit coupled to the power switch;
a first AND gate having a first input coupled to the leading edge blanking delay circuit and having a second input coupled to an output of the second comparator;
a first OR gate having a first input coupled to an output of the first AND gate and having a second input coupled to an output of the third comparator;
a first latch having a set input coupled to the second switching waveform output and having a reset input coupled to an output of the first OR gate; and
a second AND gate having a first input coupled to the first switching waveform output and having a second input coupled to an output of the first latch, the second AND gate having an output coupled to the power switch.

25. The power supply controller of claim 24 wherein the oscillator begins generating new complete cycles of first, second and third switching waveforms at the first, second and third switching waveform outputs, respectively, in response to an enable/disable signal received at the enable/disable input.

26. The power supply controller of claim 24 wherein the oscillator allows to complete existing cycles of first, second and third switching waveforms at the first, second and third switching waveform outputs, respectively, before stopping the first, second and third switching waveforms in response to an enable/disable signal received at the enable/disable input.

27. The power supply controller of claim 21 wherein the power switch comprises a power transistor coupled between the drain terminal and the source terminal, the power transistor having a gate coupled to the control circuit.

28. The power supply controller of claim 21 wherein the negative current sensor comprises:
a first current source coupled to the control terminal;
a first transistor having a source coupled to the first current source and a gate coupled to a drain of the first transistor;
a second transistor having a source coupled to the source of the first transistor and a gate coupled to the gate of the first transistor;

a third transistor having a drain coupled to the drain and the gate of the first transistor and to the gate of the second transistor, the third transistor having a source coupled to the multi-function terminal and a gate coupled to a first voltage; and a fourth transistor having a drain and gate coupled to the drain of the second transistor.

29. The power supply controller of claim 28 wherein the on/off circuit comprises:

a second current source coupled to the control terminal; and a fifth transistor having a gate coupled to the gate and drain of the fourth transistor and a drain coupled to the second current source.

30. The power supply controller of claim 28 wherein the external current limit adjuster comprises:

a third current source coupled to the control terminal;

a fourth current source coupled to the control terminal;

a sixth transistor having a gate coupled to the gate and drain of the fourth transistor and a drain coupled to the third current source;

a seventh transistor having a gate and drain coupled to the drain of the sixth transistor;

an eighth transistor having a gate coupled to the gate and drain of the seventh transistor, the eighth transistor having a drain coupled to the fourth current source; and a first resistor coupled to the fourth current source and the drain of the eighth transistor.

31. The power supply controller of claim 21 wherein the positive current sensor comprises:

a ninth transistor having a source coupled to the multi-function terminal and a gate coupled to a second voltage;

a tenth transistor having a gate and drain coupled to a drain of the ninth transistor;

an eleventh transistor having a gate coupled to the gate and drain of the tenth transistor;

a twelfth transistor having a source coupled to the control terminal and a gate and drain coupled to a drain of the eleventh transistor; and a fifth current source coupled to a source of the tenth transistor and coupled to a source of the eleventh transistor.

32. The power supply controller of claim 31 wherein the under-voltage comparator comprises:

a thirteenth transistor having a source coupled to the control terminal and having a gate coupled to the gate and drain of the twelfth transistor; and a sixth current source coupled to a drain of the thirteenth transistor.

33. The power supply controller of claim 31 wherein the over-voltage comparator comprises:

the fourteenth transistor having a source coupled to the control terminal and having a gate coupled to the gate and drain of the twelfth transistor; and a seventh current source coupled to a drain of the fourteenth transistor.

34. The power supply controller of claim 31 wherein the maximum duty cycle adjuster comprises:

a fifteenth transistor having a source coupled to the control terminal and having a gate coupled to the gate and drain of the twelfth transistor;

a first diode coupled to a drain of the fifteenth transistor; and an eighth current source coupled to the drain of the fifteenth transistor.

* * * * *

UNITED STATES PATENT AND TRADEMARK OFFICE
CERTIFICATE OF CORRECTION

PATENT NO. : 6,304,462 B1
DATED : October 16, 2001
INVENTOR(S) : Balakrishnan et al.

It is certified that error appears in the above-identified patent and that said Letters Patent is hereby corrected as shown below:

<u>Title page,</u>
Under Item [56], U.S. PATENT DOCUMENTS, delete "Majid et al. ." and insert
-- Majid et al. --

Signed and Sealed this

Eleventh Day of June, 2002

Attest:

Attesting Officer

JAMES E. ROGAN
*Director of the United States Patent and Trademark Office*